United States Patent [19]
Witherspoon et al.

[11] Patent Number: 6,124,563
[45] Date of Patent: Sep. 26, 2000

[54] PULSED ELECTROTHERMAL POWDER SPRAY

[75] Inventors: F. Douglas Witherspoon, Fairfax Station; Dennis W. Massey, Manassas, both of Va.

[73] Assignee: Utron Inc., Manassas, Va.

[21] Appl. No.: 09/046,610

[22] Filed: Mar. 24, 1998

Related U.S. Application Data

[60] Provisional application No. 60/035,606, Mar. 24, 1997.

[51] Int. Cl.⁷ ....................................................... B23K 9/00
[52] U.S. Cl. ................................... 219/121.47; 427/446
[58] Field of Search ................................. 219/121.47, 76, 219/121 P, 75; 89/7, 8; 204/164; 427/446; 239/8

[56] References Cited

U.S. PATENT DOCUMENTS

| | | |
|---|---|---|
| 2,922,869 | 1/1960 | Gannini et al. ............................ 219/75 |
| 3,212,914 | 10/1965 | Lyle et al. . |
| 3,312,566 | 4/1967 | Winzeler et al. . |
| 4,142,089 | 2/1979 | Lau et al. . |
| 4,370,538 | 1/1983 | Browning . |
| 4,374,075 | 2/1983 | Yolton et al. . |
| 4,592,781 | 6/1986 | Cheney et al. . |
| 4,689,463 | 8/1987 | Shubert . |
| 4,715,261 | 12/1987 | Goldstein et al. . |
| 4,788,402 | 11/1988 | Browning . |
| 4,821,508 | 4/1989 | Burton et al. . |
| 4,821,509 | 4/1989 | Burton et al. . |
| 4,948,485 | 8/1990 | Wallsten et al. . |
| 4,974,487 | 12/1990 | Goldstein et al. . |
| 4,990,739 | 2/1991 | Zaplatynsky . |
| 5,206,059 | 4/1993 | Marantz . |
| 5,228,620 | 7/1993 | Anderson et al. ........................... 239/8 |
| 5,262,206 | 11/1993 | Rangaswamy et al. . |
| 5,296,667 | 3/1994 | Marantz et al. . |
| 5,374,802 | 12/1994 | Dorfman et al. . |
| 5,425,231 | 6/1995 | Burton . |
| 5,442,153 | 8/1995 | Marantz et al. . |
| 5,451,740 | 9/1995 | Hanus et al. . |
| 5,923,293 | 8/1999 | Belashchenko et al. ............... 427/446 |

FOREIGN PATENT DOCUMENTS 0 232 594   11/1986   European Pat. Off. .

OTHER PUBLICATIONS

Abbott, Kenneth E., "Plastic Media Blasting—State of the Technology," MP, vol. 31, No. 2, Feb. 1992, pp. 38–39.

Cavallo, Jon R., "Cleaning with Air–Propelled Foam Media," MP, vol. 31, No. 2, Feb. 1992, pp. 43, 45.

Appleman, Bernard R. et al., "Other Methods and Factors in Surface Preparation," Steel Structures Painting Manual, Steel Structures Painting Counsel, Sep. 1993.

Snowdon, Kenneth G. et al., "Accelerated Laser Ageing of Plastics," SPIE, vol. 1023, 1988, pp. 158–165.

Feldmann, D. et al., "UV–Laser Photablation of Polymers," SPIE, vol. 1023, 1988, pp. 145–152.

Sercel, J. et al., "Industrial Microprocessing Applications of Excimer Lasers," SPIE, vol. 998, 1988, pp. 76–83.

Steinmetz, M. et al., "Temperature Changes During Photoablation Processes," SPIE, vol. 998, 1988, pp. 52–56.

Landau, L.D. et al., "Fluid Mechanics," Pergamon Press, pp. 192–200.

Brick, Robert M. et al., "Structure and Properties of Engineering Materials," McGraw–Hill, pp. 149–152.

Appleman, Bernard R. et al., "Systems and Specifications," Steel Structures Painting Manual, Steel Structures Painting Council, Mar. 21, 1995, Guide 6.

Appleman, Bernard R. et al., "Systems and Specifications," Steel Structures Painting Manual, Steel Structures Painting Council, Jul. 15, 1995, Guide 7.

Katauskas, Ted, "Dot Coats Rusting Bridges with Layers of Problems," R&D Magazine, May 1990, pp. 42–48.

Pinto, Gerard R. et al., "Elucidating Ablation Mechanisms Through SIMS Studies of Cross–Linked Polymer Surfaces," J. Phys. Chem., vol. 99, No. 5, pp. 1543–1547.

Joubert, O. et al., "Polymer Behavior Under Plasma Etching: Influence of Physical Properties on Kinetics and Durability," J. Appl. Phys., vol. 70, (2), Jul. 15, 1991, pp. 977–982.

Srinivasan, R. et al., "Ablation of Polymers with Pairs of Ultraviolet Laser Pulses with Controlled Temporal Separation," SPIE, vol. 1023, 1988, pp. 141–144.

Klick, David et al., "Excimer Laser Curing of Polymer Coatings," SPIE, vol. 998, 1988, pp. 95–104.

Poulin, G. et al., "Advances in Excimer Laser Materials Processing: An Update," SPIE, vol. 1023, 1988, pp. 203–207.

Greig, J.R. et al., "The Disintegration and Vaporization of Plastic Targets Irradiated by High–Power Laser Pulses," J. Appl. Physics, vol. 48, No. 2, Feb. 1977, pp. 596–604.

Ramous, E., "A Note on Rapid Surface Melting by Laser," Journal of Materials Processing Technology, vol. 57, 1996, pp. 1–3.

Gilligan, J. et al., "Studies to Reduce Material Erosion in Electrothermal Launchers," 5th Symposium on Electromagnetic Launch Technology, Destin, Florida, Apr. 2–5, 1990.

Bourham, M.A. et al., "Comparative Study of Components Erosion for Electromagnetic and Electrothermal Launchers," N.C. State University, Dept. of Nuclear Engineering.

Gaston, Beth, "Supersonic Abrasive Ice–Blasting," NSG Press Release 94–58, Oct. 5, 1994.

Petreanu, J.P. et al., "Deleading Paint by Bitrification Using Thermal Spray Technology," Proceedings of the 1993 National Thermal Spray Conference, Jun. 7–11, 1993, Anaheim, CA., pp. 629–634.

Covey, S. et al., "In Situ Vitrification and Removal of Lead Based Paint for Steel Structures," Proceedings of the 8th National Thermal Spray Conference, Sep. 11–15, 1995, Houston, Texas, pp. 605–614.

Fliescher, D., "Ceramic Insulators for Pulsed Electrothermal Discharges," Contract No. DNA001–86–C–0072, Jan. 30, 1997.

Kear, B., "Advanced Metals," Scientific American, Oct. 1986, pp. 159–167.

White, D.G., "Powder Metallurgy in 1995,"Advanced Materials & Processes, Aug. 1995, pp. 49–51.

Steinberg, M.A., "Materials for Aerospace," Scientific American, Oct. 1986, pp. 67–72.

Ayers, J.D. et al., "Very Fine Metal Powders," Journal of Metals, vol. 37, No. 8, Aug. 1985, pp. 16–21.

Lawley, A., "Atomization: The Production of Metal Powders," Metal Powders Industry Federation, Princeton, NJ, 1992.

Erickson, A.R. et al., "Injection Molding," Metals Handbook 9th Ed., vol. 7, American Society for Metals, Metals Park, Ohio, 1984, pp. 495–500.

Ayers, J.D., "Fine Particles," The Elliot Symposium, Iron & Steel Society, Inc., Warrendale, Pennsylvania, 1991, pp. 273–299.

Cheney, R.F. et al., "The Production of Rapidly Solidified Ultrafine Metal and Ceramic Powders," The Metallurgical Society, Warrendale, Pennsylvania, 1989, pp. 297–308.

Anderson, I.E. et al., "Flow Mechanisms in High Pressure Gas Atomization," Materials Science and Engineering, vol. A148, 1991, pp. 101–114.

Cooper K.P. et al., "Counter Rotating Fluid Atomization," Int. Journal of Powder Metallurgy, vol. 29, No. 3, 1993, pp. 215–226.

Cooper K.P. et al., "Evaluation of Atomization by the Rapidly Spinning Cup Process," Int. Journal of Powder Metallurgy, vol. 30, No. 1, 1994, pp. 77–89.

McGraw–Hill Encyclopedia of Science and Technology, 6th Ed., vol. 2, pp. 214–218, McGraw–Hill Book Co., 1987.

Hinze, J.O., "Fundamentals of the Hydrodynamic Mechanism of Splitting in Dispersion Process," A.I.Ch.E. Journal, vol. 1, No. 3, Sep. 1955, pp. 289–295.

See, J.B. et al., "Interactions Between Nitrogen Jets & LIquid Lead & Tin Streams," Powder Technology, vol. 21, 1978, pp. 119–133.

Yule, A.J. et al., "Atomization of Melts–For Powder Production & Spray Deposition," Clarendon Press, Oxford, 1994.

Witherspoon, F.D. et al., "High Velocity Pulsed Plasma Thermal Spray," Final Report, BMDO Contract DNA001–95–C–0140, Feb. 26, 1996.

Witherspoon, F.D. et al., "High Velocity Pulsed Wire–Arc Spray," Final Report, NASA Contract NAS8–40694, Jul 10, 1996, pp. 11–13.

Marantz, David R. et al., "State of the Art Arc Spray Technology," Proceedings of the 3rd National Thermal Spray Conference, May 20–25, 1990, Long Beach, CA., pp. 113–118.

Steffens, H.D. et al., "Recent Developments in Arc Spraying," IEEE Transactions on Plasma Science, Dec. 1990, vol. 18, No. 6, pp. 974–979.

Steffens, H.D. et al., "One Wire Vaccum Arc Spraying–A New Modified Process," Proceedings of the 4th National Thermal Spray Conference, May 4–10, 1991, Pittsburgh, PA., pp. 395–398.

Marantz, D.R. et al., "Wire–Arc Plasma Spray Process–Basic Principle and It's Versatility," Proceedings of the 4th National Thermal Spray Conference, May 4–10, 1991, Pittsburgh, PA., pp. 381–387.

Sampson, E.R., "The Economics of Arc vs. Plasma Spray for Aircraft Components," Proceedings of the 1993 National Thermal Spray Conference, Jun. 7–11, 1993, Anaheim, CA., pp. 257–262.

Byrnes, L. et al., "Method and Apparatus for the Application of Thermal Spray Coatings Onto Aluminum Engine Cylinder Bores," Proceedings of the 7th National Thermal Spray Conference, Jun. 20–24, 1994, Boston, MA., pp. 39–42.

Scholl, M., "Plasma Spraying with Wire Feedstock," Proceedings of the 7th National Thermal Spray Conference, Jun. 20–24, 1994, Boston, MA. pp. 491–496.

Steffens, H.D. et al., "The Sonarc Process: Combining the Advantages of Arc and HVOF Spraying," Journal of Thermal Spray Technology, vol. 3(4), Dec. 1994, pp. 398–403.

Steffens, H.D. et al., "Recent Developments in Single–Wire Vacuum Arc Spraying," Journal of Thermal Spray Technology, vol. 3(4), Dec. 1994, pp. 412–417.

Neiser, R.A. et al., "Wire Melting and Droplet Atomization in a HVOF Jet," Proceedings of the 8th National Thermal Spray Conference, Sep. 11–15, 1995, Houston, TX., pp. 99–104.

Meyer, W.B., "Metal Spraying in the U.S.: A JTST Historical Paper," Journal of Thermal Spray Technology, vol. 5(1), Mar. 1996, pp. 79–83.

Kowalsky, K.A. et al., "Characterizaiton of Coatings Produced by the Wire–Arc–Plasma Spray Process," Proceedings of the 4th National Thermal Spray Conference, May 4–10, 1991, Pittsburgh, PA., pp. 389–394.

Herman, Herbert, "Plasma–sprayed Coatings," Scientific American, Sep. 1988, pp. 112–117.

Thorpe, Merle L., "Thermal Spray Industry," Advanced Materials & Processes, May 1993, pp. 50–61.

Longo, F.N., "Industrial Guide–Markets, Materials, and Applications for Thermal–Sprayed Coatings," Journal of Thermal Spray Technology, vol. 1(2), Jun. 1992, pp. 143–145.

Brown, Alan S., "Spraying for strength," Aerospace America, Jan. 1992, pp. 52–53.

Thorpe, M.L., et al., "A Pragmatic Analysis and Comparison of HVOF Processes," Journal of Thermal Spray Technology, vol. 1(2), Jun. 1992, pp. 161–170.

Uryukov, B.A., et al., "Application of Coatings Using Pulsed Plasma Flows," Surface and Coatings Technology, vol. 48, 1991, pp. 7–11.

Shcolnikov, E.Ya., et al., "Acceleration of Powder Materials in an Electrothermal Launcher," vol. 31, No. 1, Jan. 1995, pp. 758–763.

Igenbergs, E., et al., "On the Application of Plasma Pulses Generated by Electromagnetic and Electrothermal Launchers for Surface Treatment," IEEE Trans. on Magnetics, vol. 31(1), Jan. 1995, pp. 735–739.

Kadyrov, E., "Gas–Particle Interaction in Detonation Spraying Systems," J. of Thermal Spray Technology, vol. 5(2), Jun. 1996, pp. 185–195.

Kadyrov, E., et al., "Gas Dynamical Parameters of Detonation Powder Spraying," J. of Thermal Spray Technology, vol. 4(3), Sep. 1995, pp. 280–286.

Fauchais, P., et al., "Diagnostics of Thermal Spraying Plasma Jets," J. of Thermal Spray Technology, vol. 1(2), 1992, pp. 117–128.

Igenbergs, E., et al., "The TUM/LRT Electromagnetic Launchers," IEEE Transactions on Magnetics, vol. Mag–22, No. 6, Nov. 1986, pp. 1536–1541.

Thorpe, R.J., et al., "High Pressure HVOF–An Update," Proceedings of the 1993 National Thermal Spray Conference, Anaheim, CA, 7–11 Jun. 1993, pp. 199–204.

Bourham, Mohamed A., et al., "Review of Component Erosion in Electric Launcher Tehnology," IEEE Transactions on Magnetics, vol. 31, No. 1, Jan. 1995, pp. 678–683.

Kadyrov, V.H., et al., "The Characteristics of Coatings Applied by the DEMETON Detonation Gun Process," Proceedings of the 7th Natl. Thermal Spray Conf., 20–24 Jun. 1994, Boston, Mass., pp. 269–273.

Berndt, C.C., et al., "Current Problems in Plasma Spray Processing," J. of Thermal Spray Technology, vol. 1(4), Dec. 1992, pp. 341–356.

Burton, R.L., et al., "EMET Technology for Rail Launchers," IEEE Transactions on Magnetics, vol. Mag–22, No. 6, Nov. 1986, pp. 1410–1415.

Burton, Rodney L., et al., "Energy–Mass Coupling in High--Pressure Liquid–Injected Arcs," IEEE Transactions on Plasma Science, vol. 19, No. 2, Apr. 1991, pp. 340–349.

Shapiro, Ascher H., "The Dynamics and Thermodynamics of Compressible Fluid Flow," vol. 1, John Wiley & Sons, NY, pp. 73–105.

Burton, R.L., et al., "Experiments on a Repetitively Pulsed Electrothermal Thruster," J. of Propulsion & Power, vol. 6, No. 2, Mar.–Apr. 1990, pp. 139–144.

Goldstein, S.A., et al., "Electric Cartridge Guns Using Fluids Heated by a Capillary Plasma Jet," GTD Report No. 83–11, Sep. 1983.

Burton, R.L., et al., "Mass Acceleration in a Multi–Module Plasma Jet for Impact Fusion," Final Report, Contract No. DE–AC08–84DP40202, May 1985.

Rizkalla, O.F., et al., "High–Pressure Hypervelocity Electrothermal Wind–Tunnel Performance Study and Subscale Tests," J. of Propulsion and Power, vol. 9, No. 5, Sep.–Oct. 1993, pp. 731–738.

Witherspoon, F.D., et al., "GEDI EMET Railgun Experiments at GT–Devices," Contractor Report No. ARFS-D–CR–91018, Nov. 1991.

Witherspoon, F.D., et al., "Life Cycle Testing of a Liquid Propellant Radiation–Cooled Pulsed Electrothermal (Pet) Thruster," Final Tech. Report, Contract No. NAS 3–25649, Nov. 13, 1992.

Burton, R.L., et al., "Ceramic Insulators for Pulsed Electrothermal Devices," Final Report GTD 89–5, Contract No. NAS 3–25272, May 25, 1989.

Fleischer, David, "Ceramic Insulators for Pulsed Electrothermal Discharges," Final Report, Contract No. DNA001–86–C–0072, Jan. 30, 1987.

Witherspoon, F.D., et al., "Mach 10 to 20 Electrothermal Wind Tunnel Feasibility Study and Demonstration," Final Report, Contract No. NAS1–18450, Nov. 1991.

*Primary Examiner*—Teresa Walberg
*Assistant Examiner*—Quang Van
*Attorney, Agent, or Firm*—James Creighton Wray; Meera P. Narasimhan

[57] ABSTRACT

A pulsed electrothermal powder spray apparatus and method increases coating particle velocities to the 2,000–4000 m/sec range. The apparatus includes a containment tube, which may be a reverse shock tube, having a capillary chamber section and a short barrel section. The tube is initially filled with an inert gas and powder is deposited in the barrel just downstream from the barrel's connection to the confined capillary discharge chamber. On receipt of a trigger signal, the muzzle shutter of the barrel section quickly opens, causing the inert gas to flow towards the open end of the barrel. A rarefaction wave propagates back up the barrel, towards the capillary chamber. Once the rarefaction wave reaches an electrode positioned at the front end of the capillary chamber, an arc discharge is triggered in the capillary, resulting in a quick rise in capillary temperature and pressure. Preferably, formation of the confined capillary arc discharge is triggered by a high voltage pulse generator which allows a lower, but still high, voltage pulse forming network to establish a main arc discharge between electrodes at each end of the capillary chamber. The increase in pressure and temperature resulting from the rapid electrothermal heating of the gas heats the powder deposited in the barrel and accelerates the powder down the barrel, through the muzzle opening and onto a target substrate. Control subsystems, gas delivery assemblies and cooling assemblies are included with the containment tube to form a highly efficient, easily controllable.

58 Claims, 18 Drawing Sheets

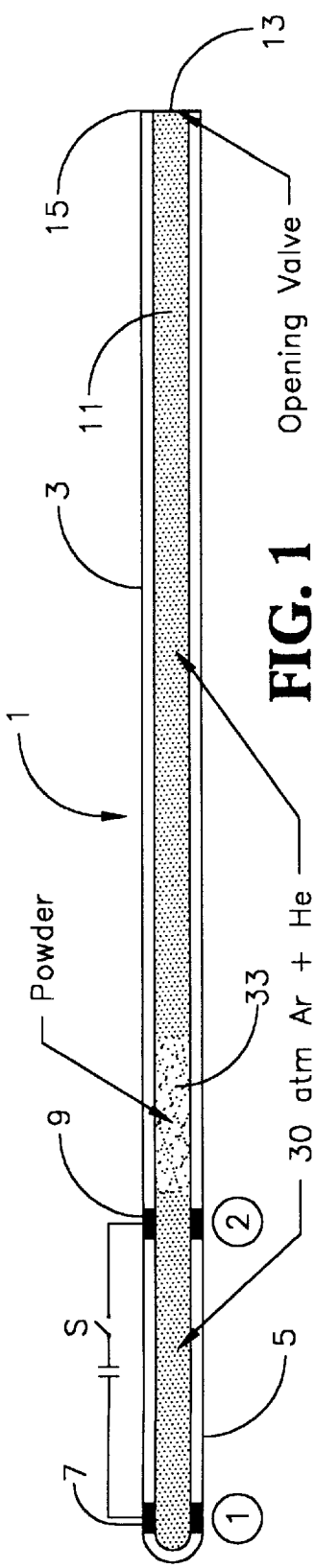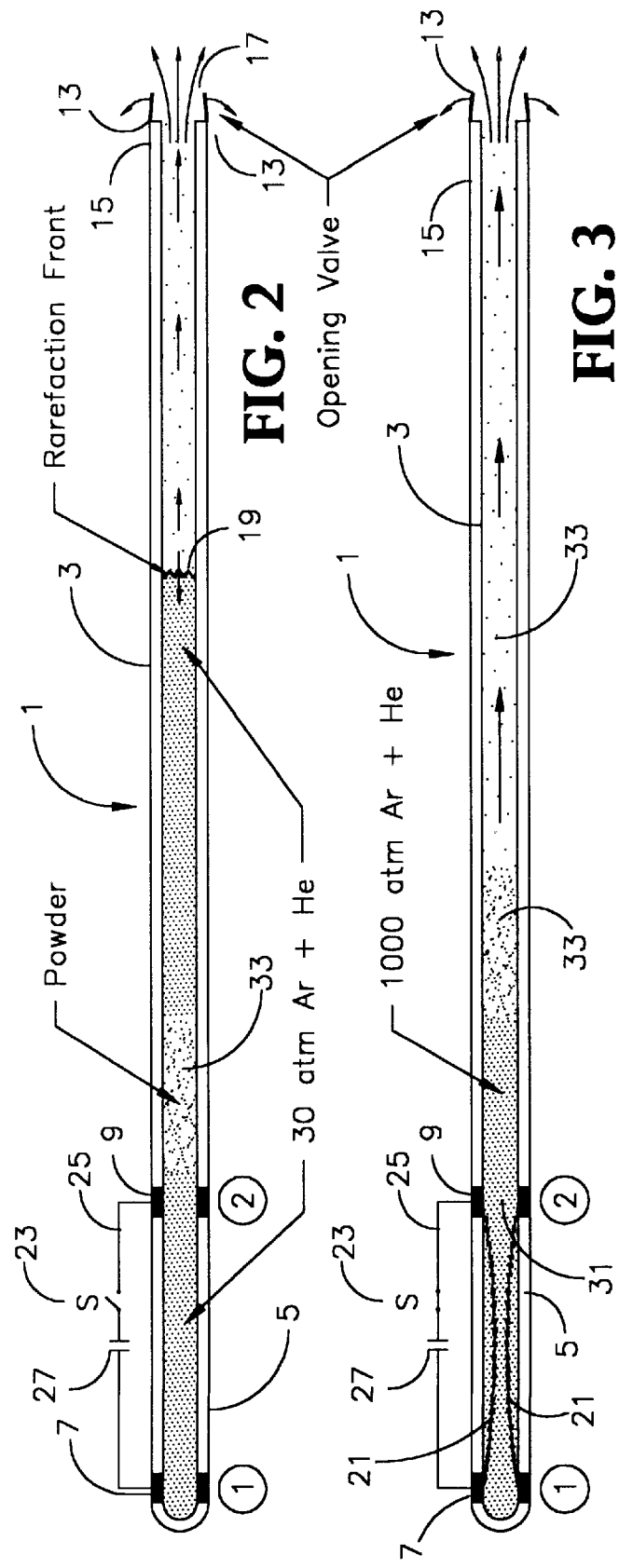

| System Parameter | Value |
| --- | --- |
| Barrel Length | 50-70 cm |
| Barrel/Capillary ID | 2.0 cm |
| Capillary length | 10-20 cm |
| Gas density | .01575 gm/cm$^3$ |
| Gas mass in capillary | 1000 mg |
| Peak velocity | 3000 m/s |
| Deposition rate | 1-5 kg/hr |
| Powder mass per pulse | 30-125 mg |
| Pulse rate | 4-10 pps |
| Fill Pressure | 10-30 atm |
| Peak Pressure | ~1000 atm |
| Peak temperature | ~1 eV |
| Energy per pulse | 10-20 kJ |
| Average power | 100-200 kW |

FIG. 5

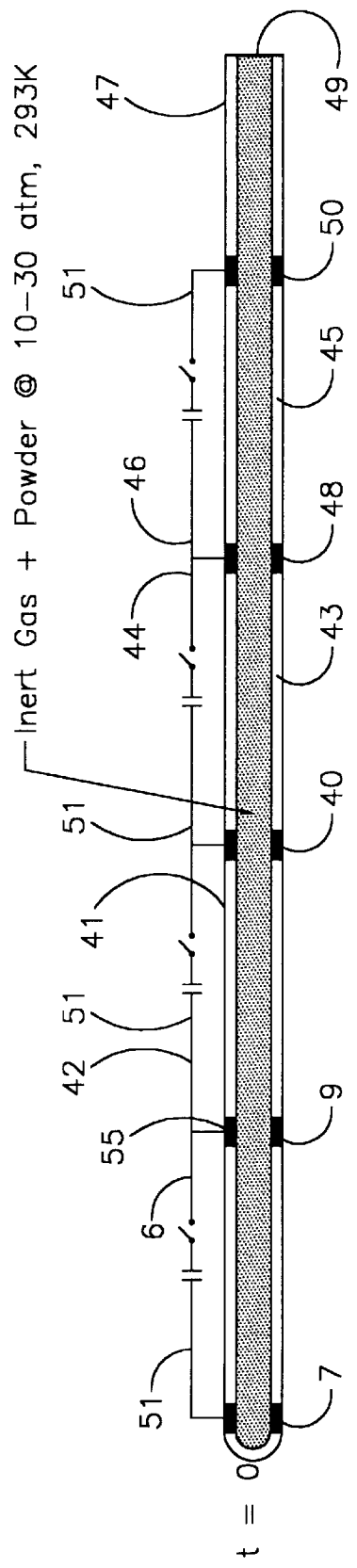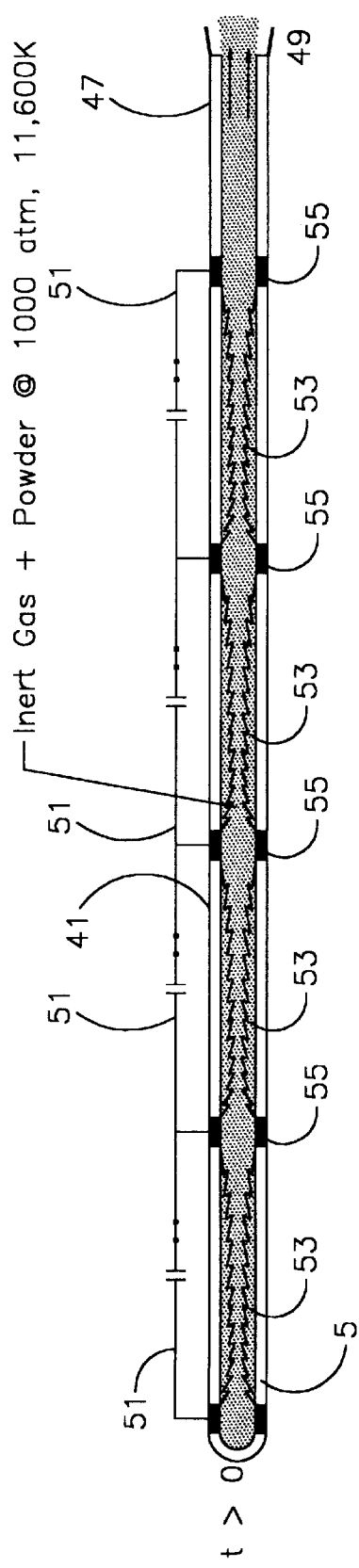

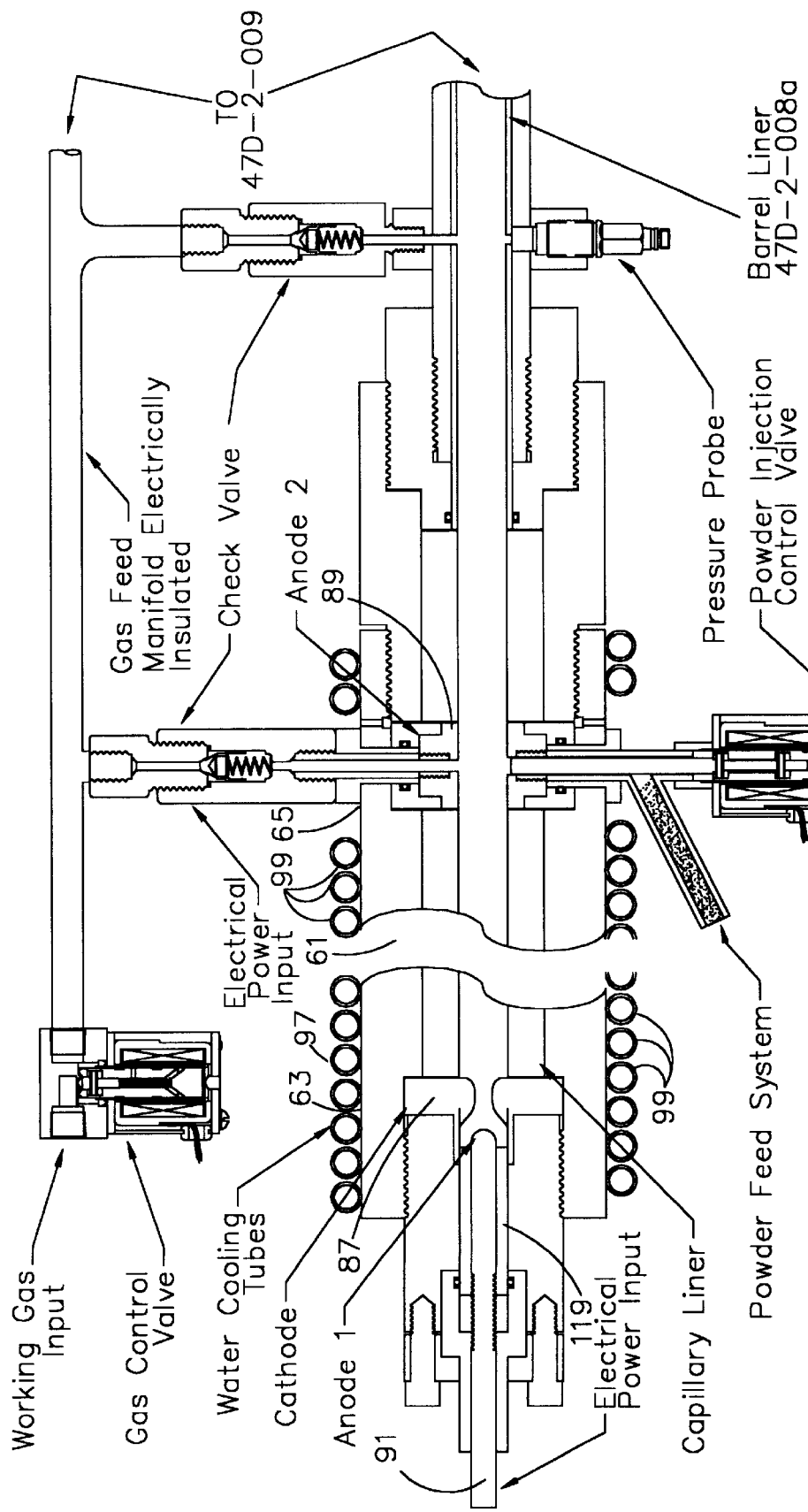

| Subsystem/Component | Function |
|---|---|
| Ceramic Capillary Chamber | Source of pulsed high pressure plasma which accelerates and heats particles |
| Gas Injection System | Fills capillary and barrel with 10-30 atm of inert gas |
| Fast Muzzle Shutter | Provides mechanism for intermittent sealing of barrel between pulses |
| Barrel | Provides acceleration space and directs plasma and particles to target. Fabricated with molybdenum inner liner. |
| Coating Powder Feeder | Feeds coating particles into barrel |
| Power Supply & Main Pulse Forming Network | Provides charging current to main PFN which supplies energy to main discharge |
| Ignitor | Provides discharge initiation through such techniques as microjets, guard electrodes, rf excitation, inductively coupled HV pulses |
| Control System | Provides programmable control of system operations |
| Cooling System | Carries away waste heat deposited in barrel and capillary walls |
| Diagnostics | Capillary pressure, current & voltage; Particle velocity, temperature, size; |
| Target Substrate Assembly | Holds target substrate and provides motion control of same |
| Fume Hood & Ventilation System | Carries away spent gases and recycles inert gases where appropriate |
| Sound Proof Room | Provides sound controlled & safe work space |
| Shroud | *(Optional)* Provides gas shroud to help protect particles from ambient atmosphere during transit from muzzle to substrate |
| Safety Systems | Provide necessary protection for personnel and equipment |

FIG. 19

Expansion Nozzle

Converging Nozzle

Converging – Diverging Nozzle

Constant Diameter

PULSED ELECTROTHERMAL POWDER SPRAY

This application claims the benefit of U.S. Provisional Application No. 60/035,606 filed Mar. 24, 1997. +gi This invention was made with Government support under Contract DNA001-95-C-0140 awarded by the Ballistic Missile Defense Organization. The Government has certain rights in this invention.

BACKGROUND OF THE INVENTION

This invention relates to thermal spray techniques for applying high performance, long lifetime coatings. More specifically it relates to a new method and apparatus for efficiently heating and accelerating powder particles to velocities much higher than current practice allows. The increased powder impact velocity on sprayed substrates will provide higher quality coatings than achievable by current practice. This invention further relates to the use of confined capillary arc discharges to produce high pressure and temperature plasma jets for heating and accelerating powder particles to high velocity.

In order to remain competitive in today's industrial market, manufacturers must provide goods with high performance, low cost, and long lifetimes. Thermal spray is a value-added process whereby protective or performance enhancing coatings are sprayed onto components to improve their operating characteristics and to extend component life. Coatings are a pervasive technology, permeating throughout all of industry and high technology applications. Coating technology is an enhancing technology that improves products and reduces cost. In many applications, coatings make it possible to achieve ends that cannot be achieved in any other known way, or in any way that is affordable.

Thermal spraying, in general, is a process for applying coatings of high performance materials, such as metals, alloys, polymers, ceramics, cermets and carbides, onto more easily worked and cheaper base materials. Because of its ability to deposit virtually any material and any combination of materials, thermal spray has a wide and growing range of applications.

Coatings are most easily grouped according to their primary function, although a given coating may provide more than one basic function. The most generally important functional applications are for thermal insulation, wear resistance, corrosion and chemical resistance, and for providing abradable and abrasive coatings, electrically conductive or resistive coatings, medically compatible coatings, dimensionally restorative coatings and polymer coatings, RFI/EMI shielding, and cosmetic repair.

As examples, coatings are applied to increase surface hardness and thus improve wear resistance, to form a protective thermal barrier which allows higher temperature operation, or to improve corrosion or chemical resistance. Coatings are also used to restore and repair the worn surfaces of expensive components, thereby eliminating the cost of replacement. New applications are being discovered daily as the industrial community becomes more familiar with thermal spray coatings and as available coating quality improves.

Spray materials are typically supplied as powders with typical particle sizes ranging from 5 μm to 100 μm or more in size. In recent years, powders less than 5 μm in size are finding some attractiveness. Powders are typically heated to a molten or near molten state by a flame or arc, simultaneously accelerated to a high velocity, and then directed against a substrate. On impact with the substrate, splats are formed, which in turn build up layers of coating material as additional splats impact. A complete coating is produced by moving the spray over the surface to be sprayed, or by moving the part relative to a fixed spray head.

The quality and durability of coatings produced using existing thermal spray techniques could be improved by, among other things, increasing the velocity with which coating particles impact the coated surface and by tighter control of the chemical and thermal environment experienced by the particles during flight. Needs exist for thermal spray techniques that increase the particle velocity and provide for better control of the chemical and thermal environment seen by the particles during flight.

Potential applications for thermal spray techniques are far reaching and include, but are not limited to, thermal barrier coatings in gas turbines, protective coatings for rocket nozzles and internal combustion engine components such as piston rings, prosthetic device coatings, coatings for hardfacing load bearing surfaces, anti-corrosion coatings for bridges and other infrastructure, and specialized coatings for the surfaces of rails and insulators in electromagnetic guns. Fabrication of ceramic substrates for electronic circuits by thermal spray techniques has long been considered, but is not currently widely accepted. That situation could be expected to improve with the availability of improved spray processes which provide denser coatings with more uniform, more homogenous and more resistive (i.e. less conductive) coatings. Needs exist for thermal spray apparatus and methods that provide dense, hard and uniform coatings with strong resistive properties.

A specific need exists to improve the lifetime and performance of military gun system components. Currently, all gun systems are limited in their performance and lifetime due to exposure to high temperature gases and, in the case of electromagnetic launchers, due to high current arc discharges. The bore components of advanced electromagnetic rail guns experience very severe and hostile environments which greatly limit their projected lifetimes. Rocket and missile performance could also be dramatically improved by increasing rocket chamber and nozzle operating temperatures. Materials exist that may dramatically improve the performance and lifetime of launchers, but in most cases those materials are either very expensive or otherwise inappropriate for fabrication of entire parts. Research has shown that specialized coatings reduce the erosion of gun components and that tungsten base alloys, for example, show essentially no erosion for heat fluxes and exposure times of useful interest. Specifically, the performance of new hypervelocity guns such as the Electric Light Gas Gun (ELGG), the Combustion Light Gas Gun (CLGG), electrothermal-chemical guns and electromagnetic guns would see dramatic performance improvements if barrels and chambers were coated with materials that provided safe operation at high temperatures for long lifetimes. Needs exist for coating methods and apparatus which effectively use small amounts of those materials as specialized coatings for reducing system cost and for increasing performance in guns and missiles.

The performance of internal combustion engines, gas turbines, steam turbines and many other devices could also be dramatically improved if higher operating temperatures could be tolerated along with increased erosion and corrosion resistance. Advanced thermal barrier coatings could provide this improvement.

Dimensional restoration of aircraft worn landing gear assemblies could be a very large potential market for advanced thermal spray technology, but the quality of currently available thermal spray coatings is not sufficient for the FAA to approve the process for restoration of these and other critical aircraft assemblies. The potential to achieve true metallurgical bonding at high velocity holds the promise of acceptance of thermal spray repairs for these assemblies, opening up a large new market that does not now exist. Restoration of landing gear is a strong contender for an early niche market for pulsed electrothermal powder spray, since it is a very high value added service that cannot be achieved with any other known thermal spray process. The savings to the airline industry are expected to be in the millions of dollars annually.

Metallurgical bonding is also a desirable feature for any metallic coating, especially those used for heavy equipment which often requires repair or replacement of heavy load bearing surfaces. WC-Co is one such coating material used in such application. If such coatings could be sprayed on with a smoother as sprayed surface, lower cost would result since post processing of the surface would not be required. Needs exist for a thermal spray apparatus which can achieve true metallurgical bonds between the sprayed coating and the material substrate.

Thermal spray includes a variety of approaches, but can be grouped into three main coating processes: combustion, wire-arc, and plasma. Each approach has its advantages and disadvantages that tend to position it in particular areas of application. Those approaches include (in roughly ascending order of coating quality and with particle impact velocities listed in parentheses): flame spray (30 m/s), flame wire spray (180 m/s), wire-arc spray (240 m/s), conventional plasma spray (240 m/s), detonation gun (910–1200 m/s), high efficiency oxyfuel (610–1200 m/s), high-energy plasma (240–1220 m/s) and vacuum plasma (240–610 m/s). Thermal spray techniques are further subdivided into continuous and detonation processes.

Most of the approaches listed above involve continuous processes. The detonation gun is the most notable exception. While the detonation gun produces some of the highest quality coatings, the pressures and temperatures attainable are limited due to the combustion process used, and only incremental improvements can be expected. Recent improvements in high-velocity oxyfuel spray makes it competitive with detonation gun-applied coatings in some applications. High-velocity oxyfuel spray coating quality is roughly comparable to coatings applied by detonation guns.

Thermal spray has a rich history, but there is considerable room for improvement in the technology. As related by Thorpe and by Berndt, et al, there are substantial limitations in existing thermal spray apparatus and methods which have slowed or prevented the expansion of existing markets and the penetration of new markets and new application areas. The quality of coatings produced by existing thermal spray technology and the economic viability of the coatings produced are limited by numerous factors including:

- a need for higher particle impact velocities, which generally produce better coatings;
- a need for more uniform spray patterns, with more uniform spatial and temporal velocities desired;
- lack of sensitivity to feedstock materials and other process variables;
- inefficient use of the energy used to melt coating materials;
- deposition inefficiencies, which are less than 50% for some materials;
- coating properties that are not equivalent to those of wrought material;
- high cost of high-performance materials;
- inadequate coating consistency and reproducibility;
- unreliable equipment;
- low spray rates; and
- lack of industry standards for spray guns and few for coating materials. (No coating may be considered generic and reproducible at this time, partly due to the inability to accurately model existing systems.)

Needs exist for thermal spray technology that addresses these limitations.

Particle impact velocity is one of the most important factors in coating quality. One of the main areas of research and innovation in the industry has been the quest for ever higher velocities. Higher velocity impact generally produces denser, harder and more uniform coatings having lower porosity and higher adhesion and cohesion. In addition, higher velocity impact tends to produce coatings with less induced stresses.

Acceleration of a single coating particle is determined by solving the drag equation [ref]

$$\frac{dv_p}{dt} = \frac{3}{4} \frac{C_d}{d} \left( \frac{\rho_g}{\rho_p} \right) (v_g - v_p)^2,$$

where $v_p$, $\rho_p$, and d are the particle velocity, density and diameter respectively, $\rho_g$ and $v_g$ are the gas density and velocity as determined by the fluid equations, and $C_d$ is the drag coefficient, which is approximately 0.44 for most cases of interest in thermal spray. It will be clear to one skilled in the art of fluid flow that this equation tells us that for a given particle size and density, the determining factors are the velocity of the gas relative to the particle and the density of that gas. The higher the gas density and the higher the relative velocity, the stronger is the accelerating force on the particle. In essence, one of the goals of all thermal spray devices is to maximize this quantity.

Virtually all thermal spray devices currently operate at or near atmospheric gas density, and thus attempts to increase powder velocity focus mostly on increasing the gas velocity. However, increases in gas velocity are quite limited due to the combustion processes used in flame spray, HVOF, detonation gun and the like, with only incremental improvements being made over periods of many years.

As related by Berndt, et al, needs exist for coating processes and apparatus having the following characteristics:

- uniform and controllable velocities of particles on impact;
- sufficient velocity to produce a high density deposit without "exploding" the molten or partially molten droplets on impact;
- uniform and controllable heating of particles;
- attainment of fully molten or plastic particles without vaporization or undesired reactions;
- isolation from or controlled interaction with the ambient environment; and
- stable process conditions with highly reproducible results.

Despite the limitations of existing thermal spray systems, a large market has developed over the years. However, penetration of thermal spray technology into new application areas, such as the automotive industry and electronics, is fundamentally constrained by limitations in the existing technology and by high cost. Needs exist for economically viable thermal spray technology that addresses those limitations and that provides for the expansion of existing applications and the entry of the technology into new markets.

High quality coatings are difficult to make due to the high temperatures required to melt materials and due to the difficulty of accelerating powders to high velocity. Factors contributing to those difficulties include the lack of control over the chemical environment and the inability to prevent oxidation reactions from occurring on the surfaces of the powder particles prior to impact on the substrate. High quality coatings are also difficult to make due to the requirement for high impact velocity of the powders on the substrate. It is difficult to achieve velocities above the state of the art as described above.

Needs exist for thermal spray apparatus and methods that control the chemical and thermal environments of the particles and increase the impact velocity significantly above about 1200 m/s. Velocities above 2000 m/s are of great interest to researchers and developers of new coatings A good coating also requires the proper thermal state of the particle, typically either molten or in a plastic state just below the melting point. In many cases such as for WC-Co, it is desirable to have the powder particle in a plastic state rather than completely molten. The particle must be exposed to sufficiently high temperature gas to achieve this state. In addition, the density of that gas must be sufficiently high so that the enthalpy of the gas is high enough to provide sufficient energy to bring the particle to that state on a fast enough time scale and without significant cooling of the plasma.

Researchers have investigated electrical means of increasing the gas flow velocity as a means of increasing powder impact velocities. In U.S. Pat. No. 3,212,914 the use of pulsed electrical discharges for accelerating powders was investigated, but did not confine the arc and utilized low gas densities, thus limiting the effectiveness of the technique. In U.S. Pat. No. 4,142,089 the use of coaxial railguns to spray powders is described. This is a form of electromagnetic accelerator, using magnetic forces on an arc discharge to snowplow and accelerate the gas in front of the fast moving arc. The arc then accelerates powders placed in its path. Such devices have not been commercialized and would have severe practical problems due to arc damage to the metallic cylindrical rails, the need for high current and high current switches, and due to the low gas density required for coaxial gun operation.

In a separate investigation into the use of electrothermal discharges for accelerating powders, Shcolnikov, et al have reported on the use of a plasma jet utilizing an ablative capillary insulating liner. They achieved potentially interesting velocities. However, they give no instruction as to how to convert such a device into a practical repetitively operating commercial device. The ablative liners only last for a very small number of pulses before the ablative liner material must be mechanically replaced, a very time consuming and expensive process not amenable to commercial operation. They used too small a capillary, too high a temperature, and too short a pulse length to achieve desirable commercial performance. They recognize the need to develop a method of plasma replenishment but give no instruction as to how to do this.

Historically, plasma jets have been practiced almost exclusively using ablative plastic liners. The main exception is the Pulsed Electrothermal Thruster described in U.S. Pat. Nos. 5,425,231 and 4,821,509 and 4,821,508 in which a repetitively operated capillary discharge is continuously fed by a low molecular weight gas feed and produces pulses of exhaust at 100's to 1000's of pulses per second for the purpose of producing thrust for rocket propulsion in vacuum.

Needs exist for a method which can make use of the power and control possible with confined capillary arc discharges. Needs exist to identify a repetitively operating hardware concept which maximizes the quantity $\rho_{gas}(v_{gas}-v_{powder})^2$, provides sufficient thermal energy and heating time, and whose critical hardware components would survive for commercially reasonable times. The main issue for ceramic walled capillary discharges is how to introduce a working fluid into the capillary region in a repetitive manner which not only allows the capillary liner to survive essentially indefinitely, but also provides sufficient mass to accelerate the powder without exceeding chamber and barrel temperature limits. Calculations show that it is desirable to operate the capillary discharge at roughly 1000 atmospheres peak pressure at a peak temperature of about 12,000K to achieve the desired performance.

SUMMARY OF THE INVENTION

Accordingly, it is an object of this invention to provide a new and improved method and apparatus for controllably and repetitively generating pulsed confined capillary discharges in a practical device which can heat injected powder and accelerate that powder along a barrel section to velocities significantly above the current state of the art, and to direct that powder onto a material substrate for the purpose of producing a superior coating.

It is a further object of this invention to provide a means of heating and accelerating powder particles of all kinds to velocities well above 1200 m/s, including metals, alloys, polymers, ceramics, cermets and carbides. Velocities are expected to attain values in the range 2000–4000 m/s.

It is a further object of this invention to provide a new and improved method and apparatus for controlling the chemical and thermal environment experienced by powder particles during acceleration in a thermal spray device which operates at very high velocity.

A related object of this invention is to provide a means of heating and accelerating powder particles with a working fluid (i.e. a gas) which is selected essentially independently of the energy input mechanism.

It is a further object of this invention to provide a method and apparatus for providing a working fluid for the capillary discharge in gaseous form that is substantially above atmospheric pressure and thus dense enough to provide the mass of gas required for heating and accelerating injected powder particles and to do so without exceeding temperature limitations of the chamber and barrel materials.

A related object of this invention is to create spray conditions which produce metallurgical bonding of the sprayed coating with the substrate.

These and other objects of the invention are achieved by providing a method and apparatus as described below.

A high velocity, environment controlled thermal spray apparatus and method provides for superior quality coatings. Coatings applied using the present invention are expected to be denser, harder, more uniform, have lower porosities, have lower residual stress, and have higher adhesion and cohesion than coatings applied using existing thermal spray apparatus and methods. The present invention harnesses the power and capability of pulsed confined capillary arc discharges in a repetitively operating apparatus for economically producing superior quality coatings.

The present invention is a new and innovative approach to thermal spraying which increases coating particle velocities by at least a factor of two into the 2,000–4,000 m/sec range.

Higher coating particle velocities and improved control of the particle chemical and thermal environment during flight lead to improvements in coating quality.

The present invention uses repetitively pulsed, high temperature, high pressure plasma jets generated by confined capillary arc discharges. The jets are used to heat and accelerate coating materials. The present spraying device opens new markets for thermal spray applications, improves the performance and durability of hypervelocity gun launch components and high temperature rocket components and provides for use in industrial applications where traditional thermal spray is limited.

The present invention substantially increases the gas flow velocities of thermal spray devices while simultaneously increasing the gas density. The present invention uses repetitively pulsed plasma jets generated by capillary arc discharges at high stagnation pressures (i.e., about 15,000 psi) and high temperatures (i.e., up to about 12,000°K). Those plasma jets heat and accelerate coating materials. A dramatic improvement in effectiveness over traditional detonation sprayed coatings is provided, and the range of applications for impaction coatings both in commercial applications and in defense applications is greatly expanded. In particular, the quality of ceramic and refractory metal alloy coatings for use in advanced launcher, gun and rocket systems is dramatically improved.

The present invention is based on pulsed confined capillary plasma arc discharge technology. The use of pulsed plasma discharges has been studied for applications in rocket thrusters and wind tunnels and for applications involving the acceleration of macroparticles (i.e., projectiles having masses greater than one gram) to hypervelocity. In the present invention, pulsed electrothermal plasma discharge technology is effectively applied to the problem of accelerating microparticles (i.e., approximately 10–100 $\mu$m size) to high velocities, while simultaneously tailoring the critical thermal and chemical environments experienced by the coating particles during acceleration and flight to the substrate. The produced coatings are expected to be of superior quality and will greatly expand the range of applicability of thermal spray. Metallurgical bonding of sprayed metallic coatings is anticipated.

The pulsed plasma discharges of the present invention produce pressures and temperatures limited only by the material strength of the containment tube. For example, capillary discharge pressures up to nearly 100,000 psi are routinely generated in electrothermal accelerators. Pulsed plasma discharges produce gas velocities well above those produced by existing thermal spray devices, easily exceeding 66,000 ft/sec (20 km/s) in vacuum for conditions of interest to thermal spray applications. Those capabilities are ideal for accelerating and heating powder particles. The present invention is based on repetitively operated pulsed plasma discharges and produces particle impact velocities of several km/s, as opposed to the maximum of 1.2 km/s typically achieved by existing detonation guns and high velocity oxyfuel sprays for only the smallest particles (10 $\mu$m).

That pulsed thermal spray processes can produce high quality coatings is clear from the history of the detonation gun, for decades the premier thermal spray gun. The basic pulsed electrothermal spray of the present invention may be compared to the detonation gun in the following sense. In a detonation gun oxygen and fuel (typically acetylene) are mixed with a uniformly dispersed fine powder that is cyclically injected at a pressure of one atmosphere into a one meter long shotgun-like barrel having an approximate diameter of one inch. A spark at the breech end ignites the mixture, and a supersonic detonation wave propagates down the barrel. The wave is so fast that the entire mixture is ignited before the rising gas pressure can be relieved through the muzzle (which occurs at sonic speed). The entire barrel rapidly rises to about 150 psi and about 3,500°K, heating the dispersed powder. The powder is then expelled along with the hot gas.

In the capillary arc discharge sprayer concept of the present invention, the chemical energy input is replaced by a very short duration but high power electrical arc discharge which heats a working fluid or gas to 15,000 psi or more and up to about 12,000°K. The time scale for this heating process is on the order of 100–200 microseconds. The heated plasma rapidly expands down the barrel, picking up and accelerating powder particles placed in the barrel just at the exit of the capillary. The present invention can operate either in vacuum or at substantially atmospheric pressure or any value in between. Operation in vacuum would give better performance, i.e. higher powder particle velocity.

The thermal spray system of the present invention includes a confined capillary arc discharge chamber, a barrel connected to the capillary chamber, a gas injection system connected to the capillary chamber and to the barrel, a pulsed powder feeder connected to the barrel for introducing coating particles into the barrel, a muzzle shutter for sealing the barrel between pulses, a pulse forming network driven by a charging power supply and a capacitor, electrodes at each end of the capillary chamber connected to the external pulse forming network, a triggering mechanism for establishing an initial conducing path between electrodes connected to the network and to the capillary chamber, a control system, a cooling system and diagnostics for evaluating operational conditions.

The basic confined capillary discharge chamber includes a long, narrow capillary discharge channel having an insulating wall with electrodes at either end. One end, usually the cathode, is closed to contain the pressure generated by the discharge. The anode is formed by an annular electrode, with an inner diameter that may be smaller than the capillary (forming the throat), through which the discharge plasma flows. The capillary discharge chamber is first filled with gas and then driven with a short, electrical pulse. The pulse, which may originate from a pulse forming network, usually has a length ranging from 10's of $\mu$s to 2–3 msec. The length and diameter of the capillary are chosen so as to create the desired temperature of the gas in the capillary, which is heated and ionized by the discharge, thereby forming a plasma. The capillary geometry creates an electrical resistance which is matched to the impedance of the pulse forming network. Under matched conditions, the stored energy is efficiently transferred from the pulse forming network to the discharge load in a single pulse. Typically, the discharge resistance is designed to be high, in the range of 0.1 to 1.0 ohms. Since the parasitic resistance of the transmission circuit and the pulse forming network is small (in the range of a few milliohms), most of the pulsed forming network energy is transferred to the discharge. Transfer efficiencies of greater than 99% are not uncommon.

Once the discharge energy has been transferred to the gas inside the capillary chamber in the form of hot gas enthalpy, the capillary acts much like the combustion chamber of a pulsed rocket. In vacuum, the time for the heated gas to flow out of the capillary is controlled by the diameter of the anode throat, $d^*$. For $d^*=d_{capillary}$, the flow time is $2L/c_s$, where L is capillary length and $c_s$ is the sound speed. For L=5 cm and $c_s = 2{,}000$ m/s, the time is 50 $\mu$s. For $d^* < d_{capillary}$, the flow time may be up to ten times longer, but with a consequent reduction in the density of the expelled gas.

Not all of the energy in the hot gas flows out from the capillary, as some energy is deposited in the wall of the discharge chamber. The transfer of heat from the hot gas to the capillary wall is difficult to calculate, but a conservative estimate is that at least half of the pulse forming network energy is transferred to the outflowing plasma. For repetitively operated devices, this means some form of active cooling of the chamber will be required, typically by flowing water through tubes or channels in intimate contact with the chamber outer wall. The same is true for barrels attached to the output of the capillary discharge.

Capillary discharges operate at high pressures. That feature is advantageous to the present invention, as the geometry of the confined capillary chamber and the attached barrel converts the high pressure gas to high velocity.

The present invention provides an increase in the attainable particle impact velocity, while simultaneously controlling both the chemical and thermal environments of the coating particles during acceleration and flight. Those benefits both improve the quality of the coatings produced for advanced applications and expand existing markets and penetration into new application areas.

In comparison with its closest competitors, the detonation gun and the high velocity oxyfuel apparatus, the present invention provides for the following advantages: 1) dramatically higher impact velocity; 2) better control of the chemical environment (especially elimination of oxygen which can form undesirable oxide coatings on some powder particles during flight) through selection of the accelerating gas media independent of the energy input mechanism; 3) use of electrical power, which is cleaner and safer than using combustible gas; 4) reduced substrate heating, thereby expanding the range of potential applications; and 5) the use of a shorter barrel than the detonation gun.

The present invention allows coating processes in high velocity regimes not currently attainable, a capability desired by coating formulators and materials researchers.

A pulsed electrothermal powder spray apparatus includes at least one confined capillary discharge chamber. The capillary chamber has a first electrode positioned at a first end, and a second electrode positioned at a second end. A barrel and a nozzle are connected to the second electrode such that a continuous cavity is formed from the first end of the capillary chamber through the barrel. Preferably a movable shutter is positioned at the remote end of the barrel. A circuit is connected to the electrodes for creating discharges in the capillary chamber.

The capillary chamber preferably includes an inner insulating liner and an outer reinforcing jacket. The insulating liner is preferably made of a ceramic material selected from the group consisting of boron nitride, silicon nitride, and silicon carbide, but can include other ceramics with similar or better mechanical, electrical, and thermal characteristics. The jacket surrounding the liner is preferably made of steel or steel alloy that is heat shrunk around the ceramic liner.

In preferred embodiments, the barrel has a length ranging from about 50 centimeters to about 70 centimeters; the capillary chamber has a length ranging from about 10 centimeters to about 20 centimeters, and the cavity defined by the walls of the barrel and capillary chamber has an inner diameter of about 1 to 2 centimeters. The size of this invention can be readily scaled to larger and smaller sizes than those suggested above, depending on the desired size of the spray deposition spot and on the spray deposition rate in kg/hr. Energy per pulse scales roughly in accordance with the volume of the capillary discharge region. Faster opening muzzle valves would also allow shorter barrels.

Preferably, the first electrode of the capillary chamber has an anode end and a cathode end. The anode end has an annular shape and an inner diameter equal to the inner diameter of the capillary chamber. The cathode end is closed to contain pressure generated by an arc discharge. The cathode end electrode can have either an annular shape or a rod shape. The electrodes are made from appropriate electrode materials such as tungsten, tungsten alloys, copper, copper alloys, carbon, and alumina dispersion strengthened copper, or other advanced electrode materials which can withstand arcing service.

A preferred pulsed thermal spray method for applying high quality coatings includes the step of providing a containment tube having a capillary chamber and a barrel connected to the chamber. In a preferred embodiment, a movable shutter connected to a remote end of the barrel is first closed. The barrel and the capillary chamber are filled with a working gas at one or more injection points distributed along the chamber and barrel. The working gas is preferably an inert gas mixture of argon and helium, but can also include other useful gases including hydrogen, nitrogen, and oxygen. Powder is transferred to the barrel while the shutter is closed and after the chamber and barrel have been pressurized to the working pressure. The powder is injected immediately downstream of the capillary. Next, the shutter is quickly opened, thereby venting the gas from the barrel through the open shutter. A rarefaction wave propagates back up the barrel towards the capillary chamber. An electrical discharge between the two main capillary electrodes is provided in the capillary chamber when the rarefraction wave arrives at the foremost electrode of the capillary chamber and starts to enter the capillary volume. The discharge creates a high pressure, high temperature expanding plasma by electrical discharge heating and pressurizing of the gas in the capillary chamber. The expanding plasma heats, softens (in some cases melts) and drives the powder. The powder is accelerated down the barrel towards the open end of the barrel and deposited on a substrate. The method may further include the step of flushing the barrel with the working gas following the step of depositing the accelerated powder on the substrate before closing the shutter. This step also helps to cool the barrel and capillary chamber inner walls. Gas vented from the barrel may be captured and then recirculated to a gas storage assembly for reuse.

The gas injector includes a gas supply and at least one gas feed line from the gas supply. The powder feeder includes a powder supply and a powder feed line connecting the powder supply to the barrel. A cooling system around the barrel and capillary containment vessel preferably includes cooling tubes or cavities extending around the outer walls of the barrel and capillary containment vessel or liquid flow channels within the structures.

The main capillary arc discharge current is supplied by a capacitive pulse forming network electrically connected to the two main capillary electrodes. Arc discharge initiation in the 10–30 atm pressure gas in the capillary tube is triggered by a rapid rise, pulsed high voltage spike or by plasma microjets which provide a temporary conducting path for the main capacitor bank to discharge through.

A timing control is connected to the arc discharge assembly, the gas injector feeder and the shutter for monitoring and controlling operations. The control system is preferably programmable and includes a control system rack electrically connected to the shutter, the arc discharge assembly and the powder feed assembly and a computer connected to the control rack by a fiber optic link for programming operations of the control system rack. Diagnostics are connected to the containment vessel for detecting conditions in the cavity and for fine tuning the operational parameters of the device.

The barrel includes a refractory barrel liner and a metal barrel cover surrounding the barrel liner. The capillary tube further includes an inner ceramic insulating layer and a protective jacket surrounding the insulating layer. A first electrode is positioned at a closed end of the capillary, and a second electrode is positioned at an open end of the capillary. The second electrode is an anode that has an annular shape and an inner diameter that is preferably equal to the inner diameter of the capillary and barrel.

In one preferred embodiment of the present invention, the capillary chamber includes a first capillary chamber and a second capillary chamber. The circuit includes a first circuit and a second circuit. The first circuit is connected to the electrodes of the first capillary chamber, and the second circuit is connected to the electrodes of the second capillary chamber. The second capillary chamber preferably is positioned at the second end of the first capillary chamber. The powder is preferably injected into the beginning of the second capillary chamber, immediately downstream of the first chamber. The two capillary chambers are triggered either in sequence or simultaneously when the rarefaction wave arrives at either the first or the second capillary chamber.

In another preferred embodiment of the present invention the capillary chamber includes a main capillary chamber and multiple secondary capillary chambers downstream from the main capillary chamber. The circuit includes a main circuit connected to the electrodes of the main capillary chamber and multiple secondary circuits connected to electrodes in the multiple secondary capillary chambers. Preferably a single circuit is connected to each secondary capillary chamber. The barrel has been replaced by a connected series of flow-through capillary chambers, with ceramic insulators situated between electrodes. The capillary discharges can be fired in unison or with preset time delays between capillaries.

The pulsed electrothermal spray based on confined capillary arc discharges as described here and in the ongoing descriptions to follow provide the following specific advantages

- Higher velocity impact (2000–4000 m/s, which is 2–3 times conventional technology)
- Can melt anything
- Independent control of thermal and chemical environment, controllable working gas
- Potential for true metallurgical bonding rather than just mechanical gripping of the surface
- No combustible gases used making system much safer
- No vacuum system needed, high purity maintained by use of inert working gases
- Working fluid can be tailored for specific powders independent of energy input
- Potential elimination of grit blasting prior to spraying due to higher velocity impact
- Can achieve more uniform spray pattern and particle velocity distribution
- Higher performance will allow use of cheaper coating materials
- Very high velocity allows high quality coatings at greater spray angles of incidence
- Reduced substrate heating
- Advanced operating modes include functionally gradient coatings using multiple powder feed ports for multiple powder types fed in alternating sequences from one pulse to the next
- Hardware readily scaled to large or small sizes, power levels, and deposition rates
- Can readily model gun performance, reducing testing times These and further and other objects and features of the invention are apparent in the disclosure, which includes the above and ongoing written specification, with the claims and the drawings. Still other objects and advantages of the present invention will become readily apparent to those skilled in the art from the following detailed description, wherein only the preferred embodiment of this invention is disclosed in detail simply by way of illustration of the best mode contemplated for carrying out the invention. As will be appreciated, this invention is amenable to other and different embodiments, and its several details are capable of modification in various obvious respects, all without departing from the invention. Accordingly, the drawings and descriptions are to be regarded as illustrative and not restrictive in nature.

BRIEF DESCRIPTION OF THE DRAWINGS

FIGS. 1, 2 and 3 show reverse shock tube sequences, with capillary arc discharge triggered upon arrival of a rarefaction wave and subsequent acceleration and ejection of powder from the barrel.

FIG. 5 is a table listing preferred reverse shock tube sprayer parameters for the present invention.

FIGS. 14 and 15 show another embodiment of the reverse shock tube having multiple capillary sections, a complex barrel structure and additional external circuitry in a repeating pattern along the gun. The metallic barrel liner is replaced by ceramic liners.

FIG. 17A shows the capillary end of the pulsed plasma sprayer shown in FIG. 16.

FIG. 19 is a table listing the major subsystems and components of the pulsed plasma sprayer system and the functions of those subsystems and components.

DETAILED DESCRIPTION OF THE PREFERRED EMBODIMENTS

Figure 4:
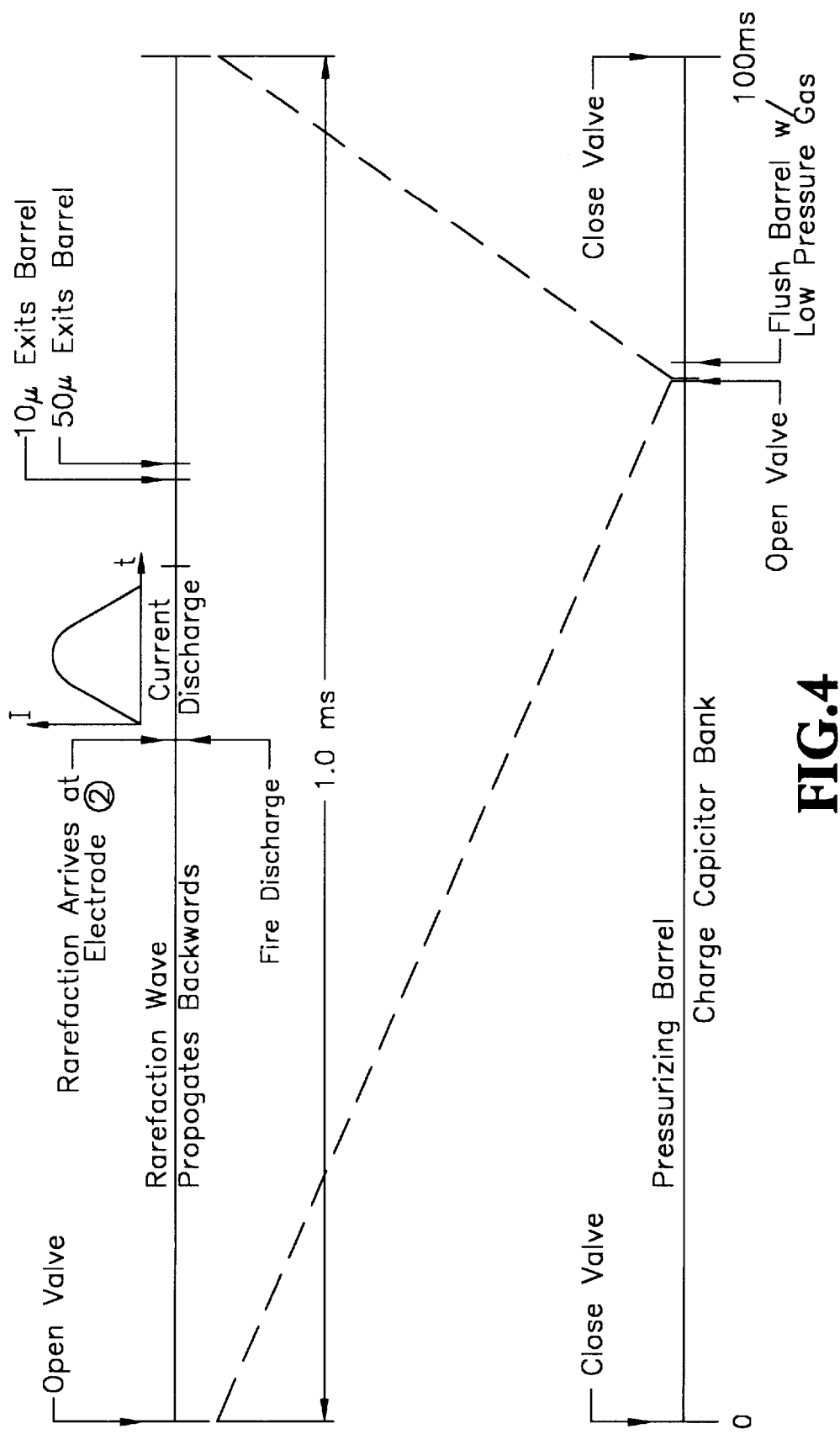
FIG. 4 shows a timeline for the reverse shock tube sequence shown in FIGS. 1–3, detailing the sequence of events for a nominal 10 Hz repetition rate. The main spray occurs in the small (approximately 1 ms) window between pressurizing the barrel and flushing the barrel, as shown in the upper, expanded timeline.
Figure 6:
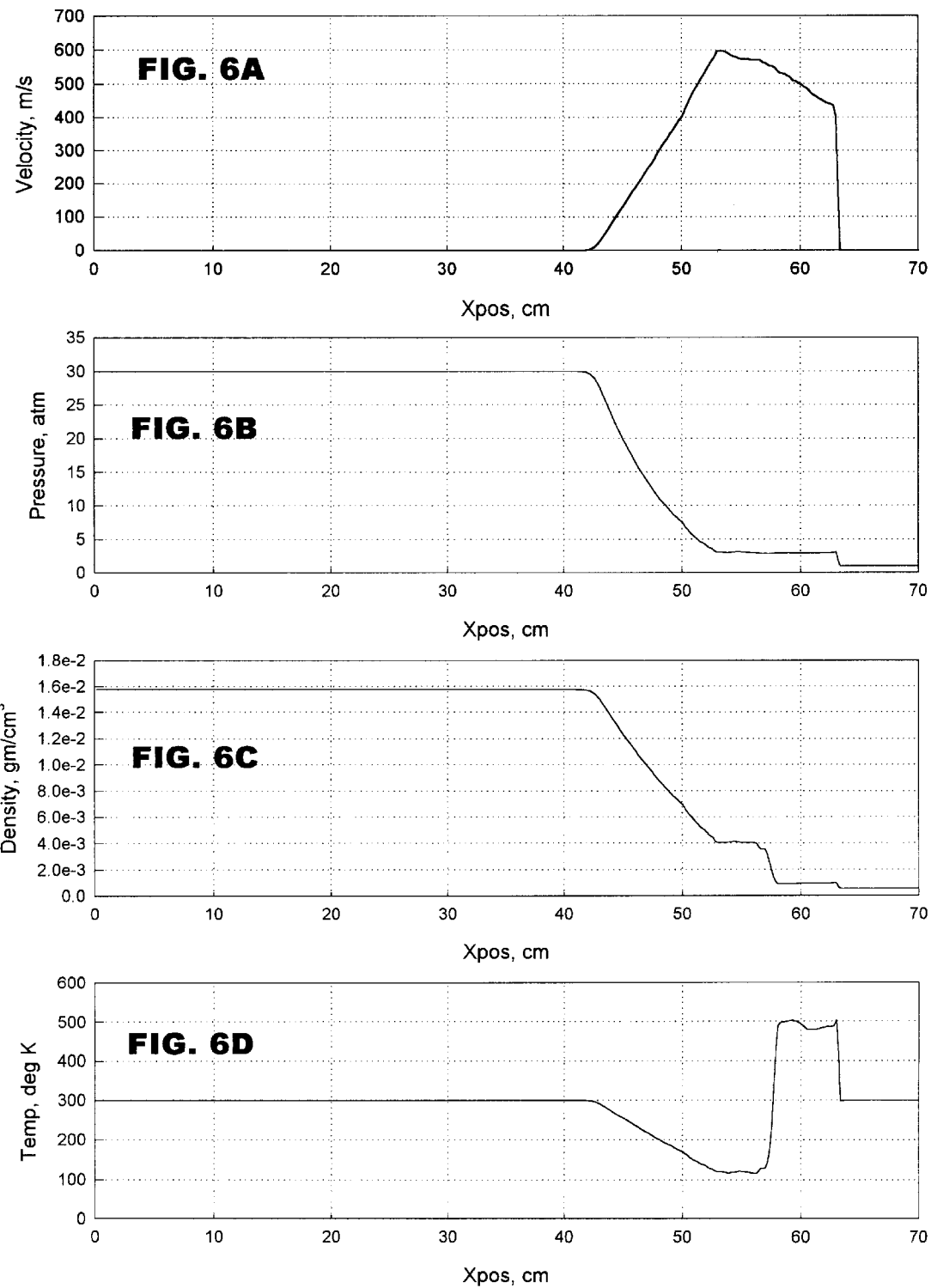
FIGS. 6*a*–6*d* graphically show calculated rarefaction propagation conditions at 130 $\mu$s.
Figure 7:
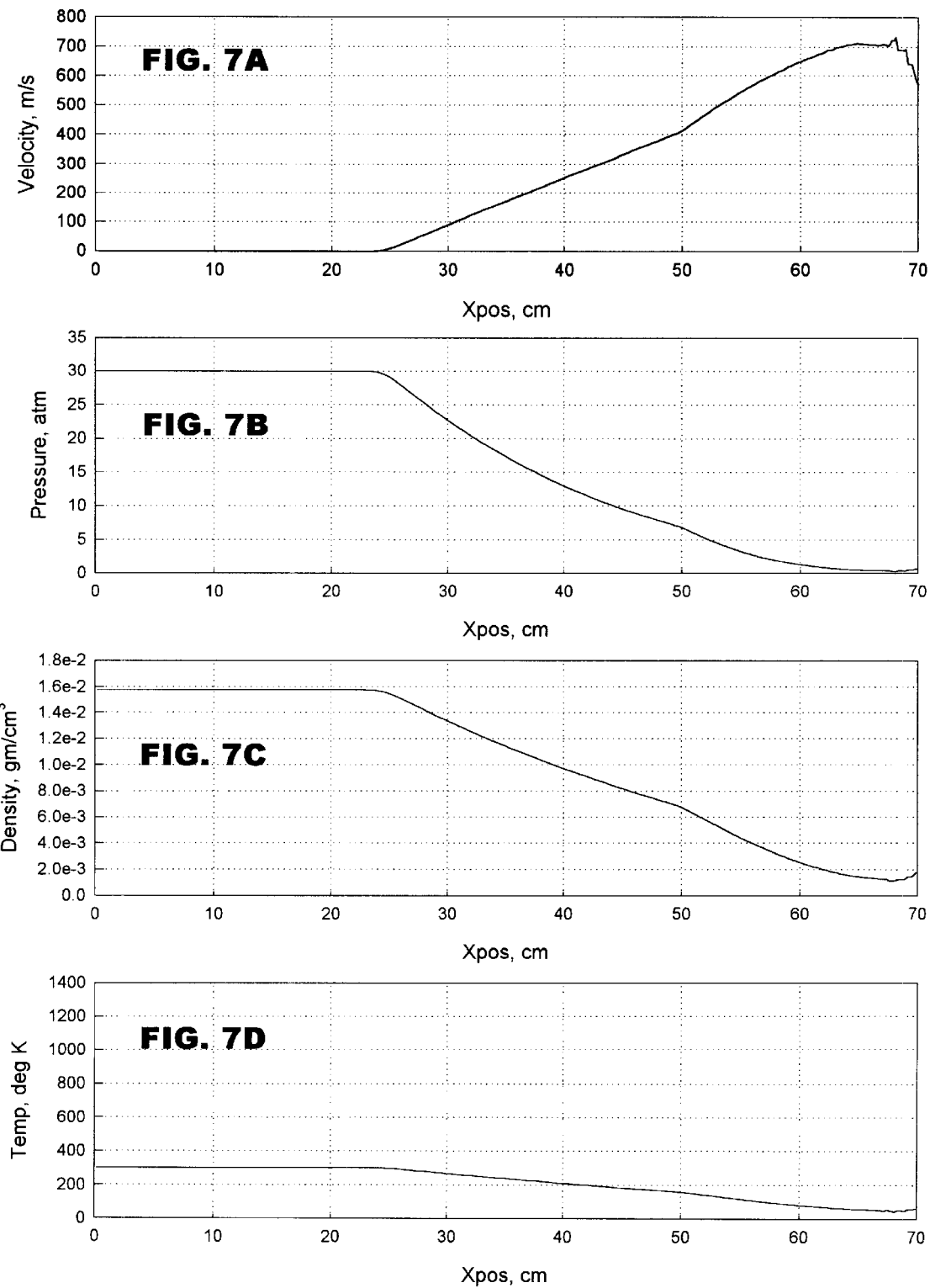
FIGS. 7*a*–7*d* graphically show calculated rarefaction propagation conditions at 448 $\mu$s.
Figure 8:
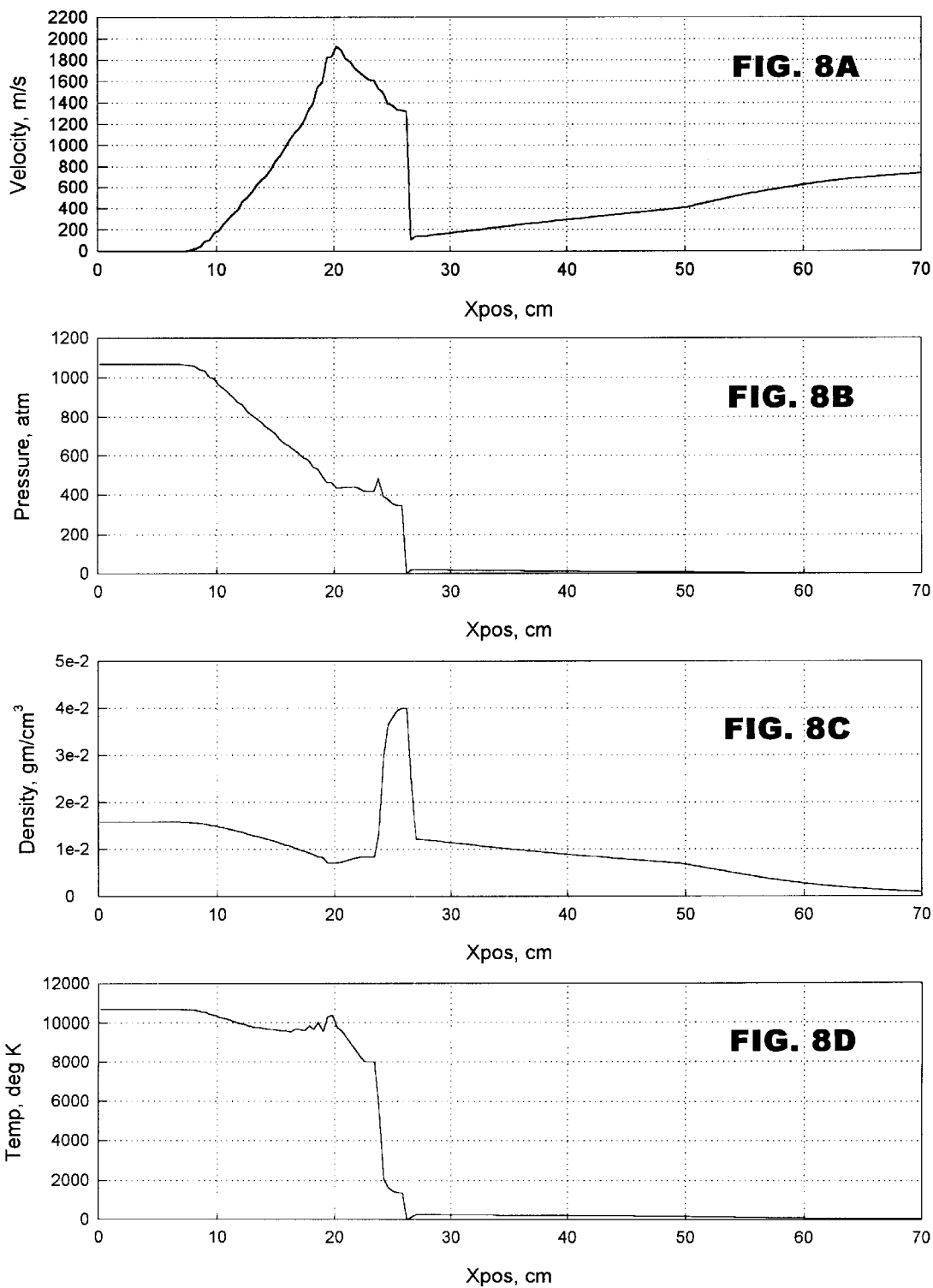
FIGS. 8*a*–8*d* graphically show calculated fluid profiles at 600 $\mu$s.
Figure 9:
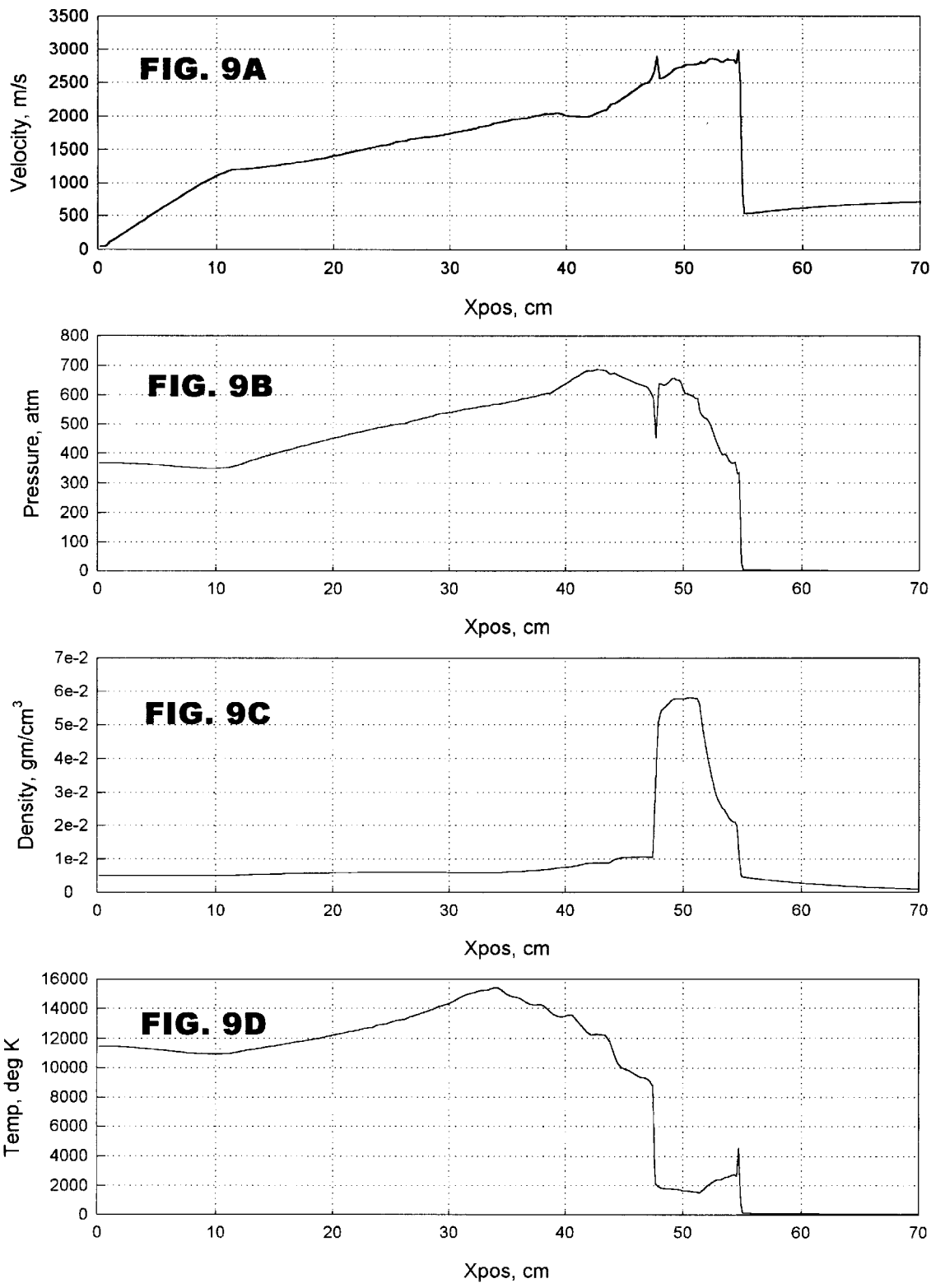
FIGS. 9*a*–9*d* graphically show calculated fluid profiles at 709 $\mu$s.
Figure 10:
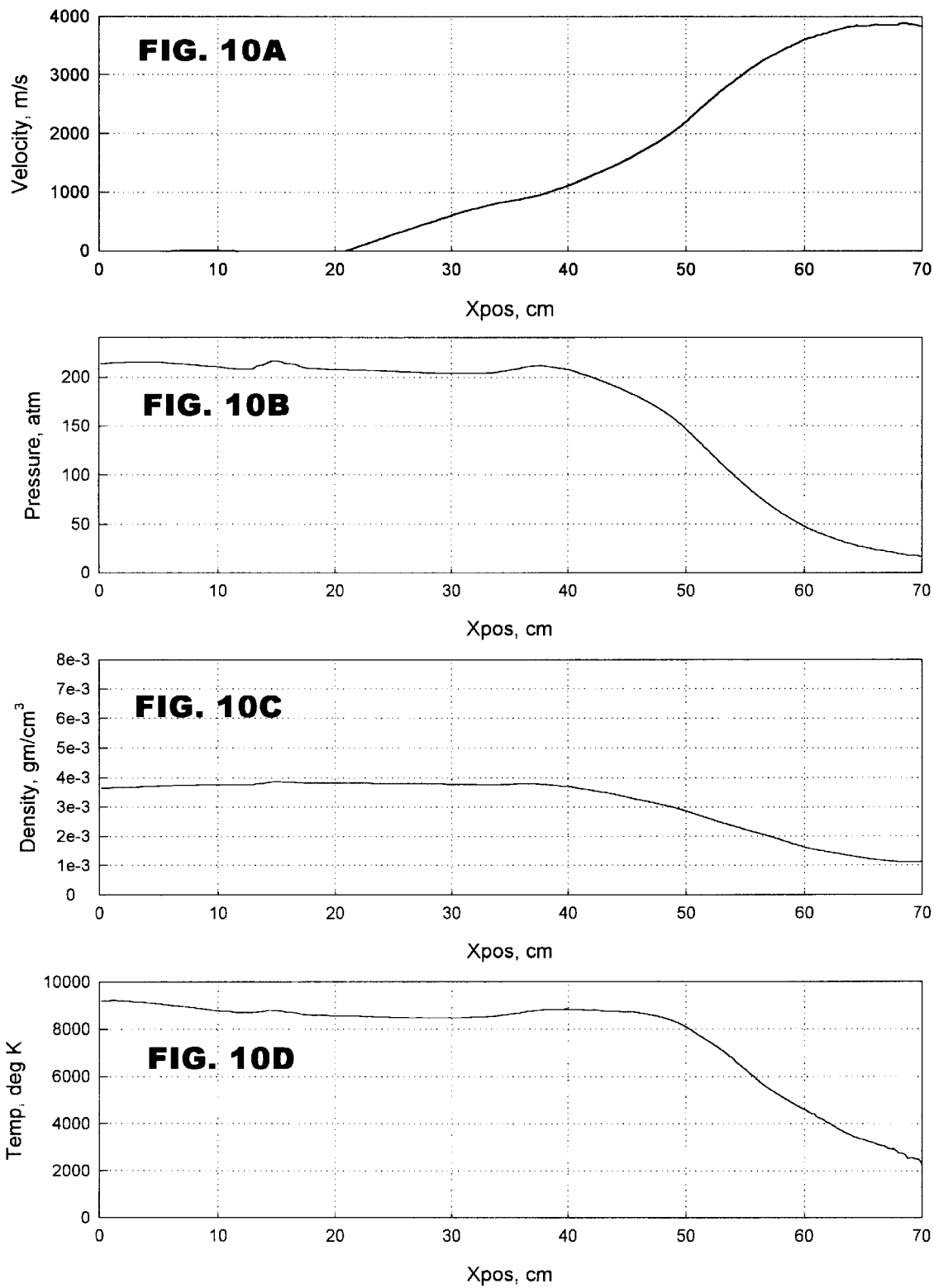
FIGS. 10*a*–10*d* graphically show calculated fluid profiles at 809 $\mu$s.

Reference is now made to FIGS. 1–3. In the present pulsed plasma sprayer system a reverse shock tube 1 includes a barrel 3 and a capillary chamber 5 having electrodes 7, 9 at either end. FIGS. 1–3 show preferred sequences for rapidly discharging plasma from the capillary chamber 5 and heating and accelerating coating powder down the barrel 3 to impact on a substrate to be coated.

The approach makes use of the physics of shock tubes, but in a somewhat backwards manner. The entire containment tube 1 is initially filled with 10–30 atm of inert gas 11, using a sealing shutter 13 positioned at the muzzle and 15 of the barrel 3, as shown in FIG. 1. After the containment tube has been pressurized to this value, a small amount of powder is puffed into the barrel immediately downstream of the electrode 9. On receipt of a trigger signal, the muzzle shutter 13 quickly opens, and gas 11 exits 17 from the barrel. This action causes a rarefaction wave 19 to propagate back up the barrel 3, as shown in FIG. 2. The rarefaction wave 19 travels at the local sound speed of the gas, about 550 m/s for a preferred mix given by Ar+3He at room temperature. Other mixes and constituent gases would yield different rarefaction speeds. By the time the rarefaction wave 19 reaches the capillary chamber 5 at electrode 9, much of the gas 11 in the barrel 3 has already exited the barrel muzzle 15. The gas that remains is already in motion towards the open muzzle 15 of the barrel 3. At that time, the capillary arc discharge 21 is triggered, as schematically shown in FIG. 3 by closing switch 23 and completing the circuit 25 from capacitor bank 27. Capillary pressure 31 quickly rises to about 1,000 atm (about 15,000 psi) and a temperature of about 11,000 K, and heats and accelerates the powder 33 down the barrel 3. The gas 11 remaining in the barrel 3 tends to reduce the peak velocity that could otherwise be obtained with an empty barrel or at one atmosphere, but the effect is relatively modest, apparently only reducing the peak velocity by about 20–25%. After that effect has been taken into account, the tube still produces velocities in excess of 2,000 m/s for 10 $\mu$ sized particles and velocities well above 1,000 m/s for 50 $\mu$ size particles. That is a dramatic improvement over existing thermal spray coating technology.

There is a great deal of flexibility in the choice of working gas. Any gas or gas mixture can be used effectively with the reverse shock tube configuration. However, inert gases provide the best control of chemistry, primarily by eliminating undesirable oxidation reactions on the surface of some powders. When oxides are being sprayed, this is, of course, not such an issue. A pure argon working gas would work, but it is preferable to mix in some amount of helium to provide better heat transport from the gas to the powder particles and to provide higher gas flow velocities. A mixture such as Ar +3He is a good choice. Hydrogen can also serve this function where safety issues are properly addressed. Nitrogen also provides a useful working gas. Pure helium or hydrogen could also be used but would require higher prefill pressures to obtain sufficient gas mass for efficient acceleration of powder, and would be more expensive, and in the case of hydrogen more of a safety problem.

An illustrative operational timeline of the reverse shock tube configuration shown in FIGS. 1–3 is shown in FIG. 4. After closing the shutter at time 0, the barrel is pressurized with a working fluid which is preferably an inert gas mix, during which time the capacitor bank is also being charged. For a 10 Hz firing rate, the time available for this is about 75 ms. Once the barrel is pressurized to 10–30 atm and the capacitor bank is fully charged, powder is puffed into the barrel immediately downstream of the electrode 9. The powder is puffed in after the barrel is pressurized to minimize the time available for it to disperse away from its injection point prior to the discharge. The shutter 13 is then immediately opened and a rarefaction wave propagates back toward the capillary chamber. When the rarefaction front reaches the second electrode 9, in about 0.5 ms, the capillary arc discharge is fired. Typical current discharge duration is about 100–200 microseconds, and high velocity coating particles begin leaving the barrel about 200 microseconds after the firing. As the pulse of high pressure gas in the barrel exits through the muzzle, the pressure drops and the working gas is allowed to reenter through the gas feed ports situated along the barrel and at the back end of the capillary. This gas acts to flush the barrel and provides cooling to the inner surface. A few milliseconds later, the shutter valve 13 closes, completing the cycle in 0.1 sec and readying the system for the next cycle in the nominal 10 Hz cycling. If desired, the muzzle shutter can remain open for an adjustable time which can be up to a few tens of milliseconds to enhance the cooling effect of the flowing gas.

This method provides a means of pressurizing a capillary volume with the required mass of working gas for heating and accelerating substantial quantities of powders without the need for a mechanical constraining mechanism at the exit of the capillary. Such mechanical mechanisms cannot be removed on a fast enough time scale for efficient use of any contained gases. Moving the constraining mechanism to the end of the barrel relaxes the speed requirements on the valve sufficiently that it can be accomplished.

The muzzle shutter valve can be any mechanism which can seal the barrel during the barrel pressurization phase, and which can then be fully opened very quickly. The required speed of opening is determined by the sound speed of the working gas filling the barrel. The higher the sound speed the faster the valve must open. It is desirable that when the rarefaction wave reaches the electrode 9 and the capillary discharge is triggered, that there is a minimum of gas in the downstream part of the barrel. This gas quantity is minimized by utilizing a valve which opens fully instantaneously, which of course cannot be achieved. In practice, it is sufficient to have the valve completely open at the time the rarefaction wave arrives at the electrode 9 and the discharge is triggered. A preferred opening time is in the range 0.5 to 2.0 milliseconds depending on the working gas being used.

The high pressure (10–30 atm) gas filling the capillary chamber requires a means of initiating a discharge through the gas. This can be accomplished by any appropriate means which can provide a short but fast rising high voltage spike superposed over or in conjunction with the main capillary capacitor bank voltage. There are several means by which this can be accomplished including, but not limited to, inductively coupled voltage pulses, rf excitation, guard electrodes, plasma microjets, or small high voltage capacitors.

Approximate values for preferred system parameters are shown in FIG. 5. The barrel diameter is similar to that of a detonation gun, but barrel length is only 50–70% that of a detonation gun. The barrel preferably has an inner diameter of 1–2 cm. That diameter is commercially attractive, due to the convenient spot size it creates on the substrate being coated. It should be clear that these values are representative of typical parameters and that these values can be scaled to larger and smaller systems while remaining within the scope and intent of the invention. Faster opening muzzle shutters would allow shorter barrels. Different spray materials and coatings will require fine tuning of these parameters to optimize coating quality. For example, polymer powders could be effectively sprayed by operating at lower peak temperatures in the capillary and still achieving very high velocity impact due to the lower density of polymer powders. This could be accomplished by operating at prefill pressures higher than 30 atm and by reducing the pulsed arc discharge energy input below 10 kJ. High pressures would still result but at significantly reduced temperatures to avoid vaporizing the polymers. Such energy and temperature tailoring can be utilized for all different types of powder materials to optimize coating characteristics.

FIGS. 6a through 11d are results of numerical simulations of the invention. FIGS. 6a–7d show velocity, pressure, density and temperature profiles inside the reverse shock tube 1 at two intermediate times during the rarefaction wave propagation back toward the capillary chamber. The event represented by FIG. 7 occurs about 100 $\mu$s prior to capillary arc discharge firing. By the time the rarefaction wave reaches the second electrode, which is when the discharge fires, less than half of the original gas remains in the barrel. The remaining gas has the velocity profile shown in FIG. 7 and continues to vent as the capillary pressure rises. In this simulation, the capillary discharge region is 20 cm long, placing the second electrode 9 at 20 cm from the back of the capillary. The initial position of the powder is placed at about 20.1 cm. The barrel length is 50 cm thus placing the muzzle exit at x=70 cm on the plots.

FIGS. 8a–10d show velocity, pressure, density and temperature profiles of the gas in the capillary chamber and the barrel at about 100, 200, and 300 microseconds after the discharge fires. The capillary ohmic input heating energy is 20kJ and is delivered in a pulse 100 $\mu$s long in this simulation. Note the propagation of the jet down the barrel and the transient shock that forms at the front of the plasma jet.

Figure 11:
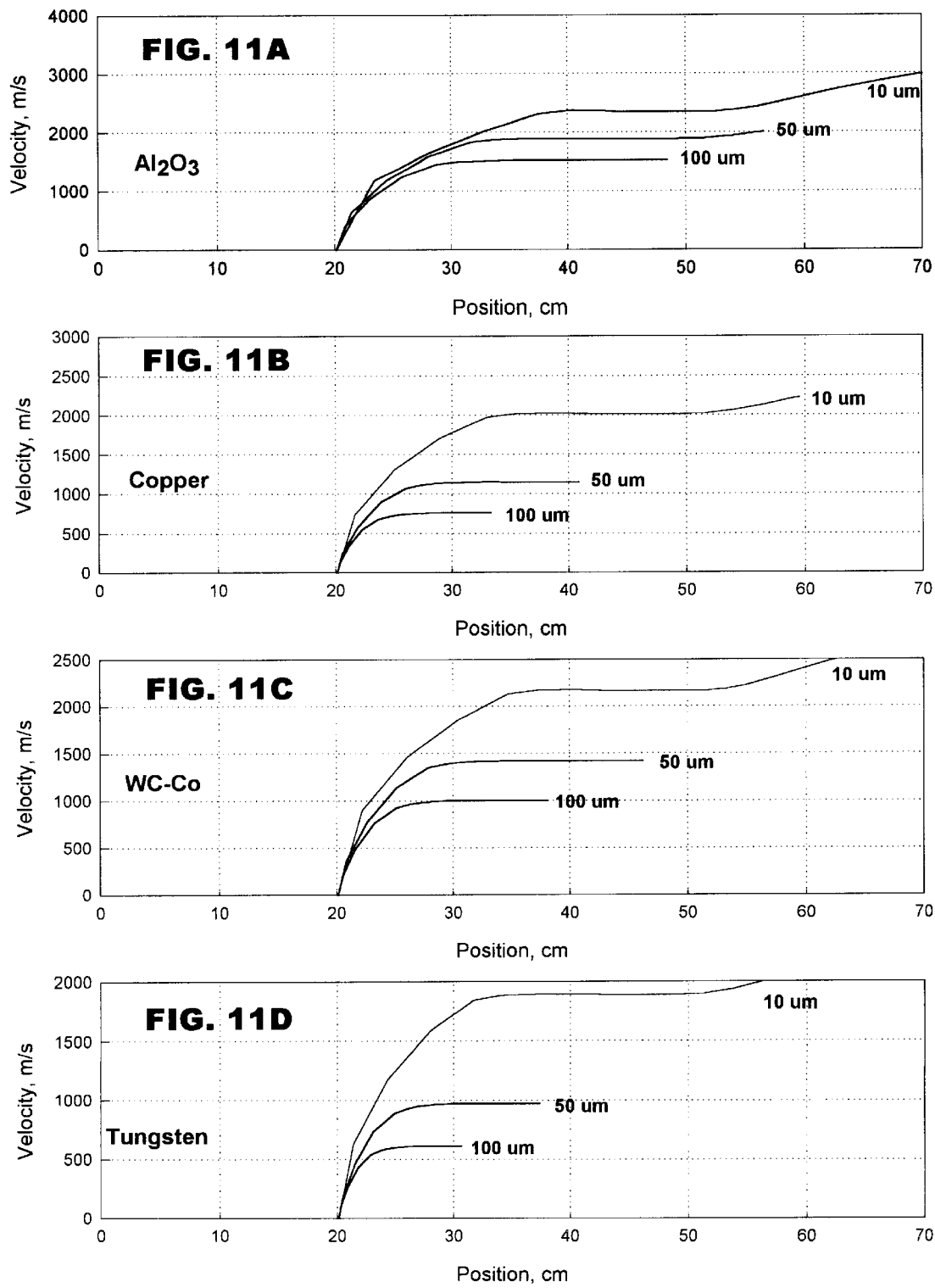
FIGS. 11*a*–11*d* graphically show calculated powder velocity vs. position relationships for 10, 50 and 100 $\mu$ diameter powder particles of varied composition in a reverse shock tube sprayer.

The powder velocity performance is shown in FIGS. 11, which plots the velocity attained by $Al_2O_3$, Cu, WC-Co and Tungsten powders of various sizes. These powders were selected as representatives of a broad range of powder density. The prior art detonation gun can achieve only 1,200 m/s for the 10 $\mu$ particles and only about 400–500 m/s for 50 $\mu$ particles. The prior art HVOF attains similar velocities as the detonation gun.

Ideally, a capillary could also be pressurized to 10–30 atm of gas by placing a fast acting piston or gate-type valve at the exit of the capillary. The speed of opening of this valve would have to be very fast, less than 100 microseconds to completely open. And it would have to seal against 1000 atm during the electrical arc discharge, and it would have to do this at 10 Hz for many hours of operation. This is apparently beyond the capabilities of current technology. By placing the opening valve at the distant end of the barrel muzzle, the following advantages accrue:

The shutter valve at the muzzle sees the lowest temperatures and pressures in the system.

Performance requirements of the shutter are greatly relaxed. Opening times are in the range of 500 $\mu$s or more.

Mechanical implementation of the shutter valve is easier. Access is not a problem.

Valve sealing and lifetime are vastly improved.

No high pressure sliding seals are necessary.

Mechanical complexity is greatly reduced in the entire system, and in the capillary chamber in particular.

Venting of the gas in the barrel acts to sweep the atmosphere out of the way for the particles following behind.

In the present invention, gas utilization rates may be high (due to filling the entire barrel and capillary with gas) only if the gas is simply discarded. Firing into a hooded enclosure would allow recycling the inert gas, which is preferably a mixture of argon and helium. This is readily accomplished, and would reduce actual flow rates to no worse, and perhaps even better, than for conventional thermal spray technology. Even if the gas were discarded, the additional benefit gained from higher performance coatings would be worth the additional cost.

The present invention can operate at a pulse rate higher than 10 Hz. Higher pulse rates increase deposition rates. Similar results can be achieved by scaling up size to handle more power per pulse. Increasing size is relatively straightforward up to 200–300 kW average power. Average powers into the MW range could be used for large jobs. Prefill pressure can be increased by a factor of two or three, and the energy input per pulse can be increased. The deposition rate is roughly directly proportional to those parameters.

Figure 12:
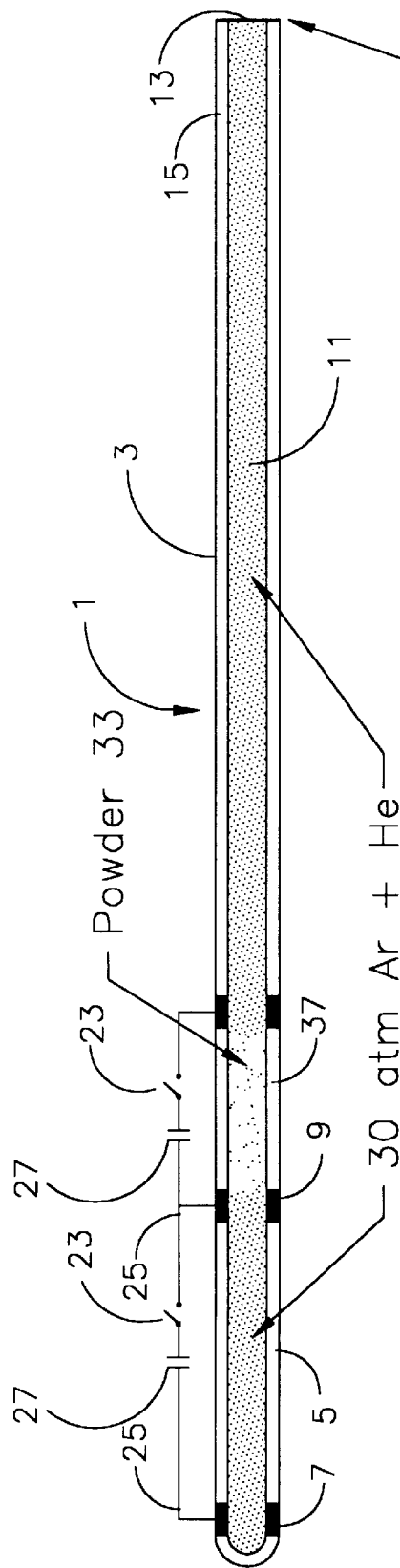
FIGS. 12 and 13 show a "hole-digging" version of the reverse shock tube shown in FIGS. 1–3, in which a second flow through capillary discharge unit has been added. The "hole-digging" embodiment provides enhanced performance by clearing out the barrel gas prior to the arrival of the main jet with powder.
Figure 13:
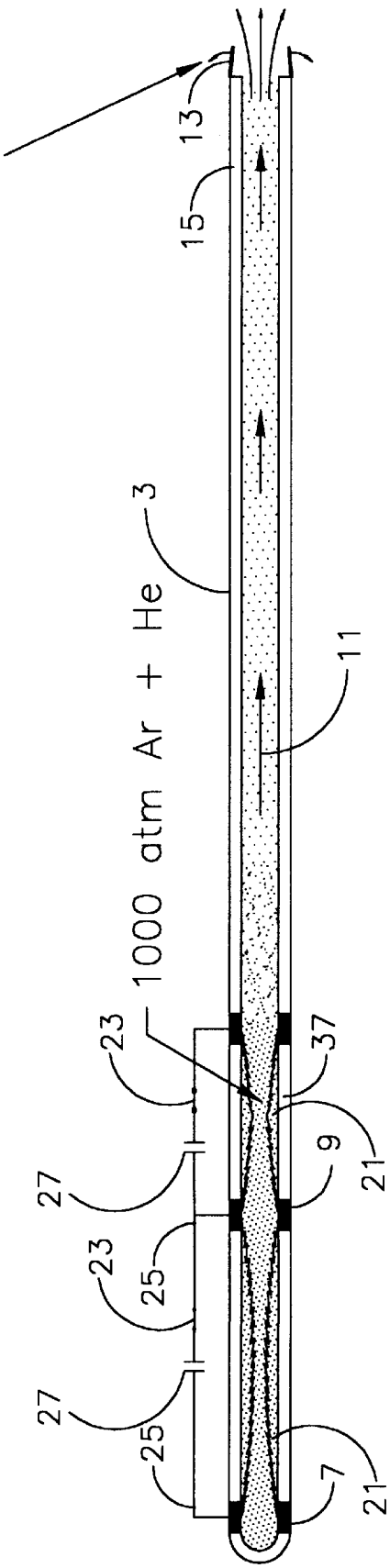

FIGS. 12 and 13 show a variation of the embodiment of the present invention shown in FIGS. 1–3. A second flow-through capillary chamber 37 is positioned either at the exit of the main capillary chamber 5, as shown, or shifted downstream a short distance. Prefill pressures are still about 10–30 atm. The second capillary chamber 37 enhances performance by further reducing the quantity of gas in the barrel 3 against which the main capillary chamber 5 must work. The second capillary chamber 37 fires simultaneously with the main capillary chamber 5 and acts to sweep out the barrel gas 11 ahead of the powder 33 and the main capillary pulse 21. Powder 33 is still placed just downstream of electrode 9 as in the case of the single capillary version described in FIGS. 1–3. Heating of the powder is also improved and higher powder velocities are expected.

This embodiment is referred to as a "hole-digging" configuration because it tends to sweep out a lower density region ahead of the powder as it is being accelerated primarily by the main arc discharge.

FIGS. 14 and 15 show another variation of the embodiment shown in FIGS. 1–3. This variation can be considered in some respects as an electrothermal version of a detonation gun but which has no supersonic detonation wave and does not use combustible gases to provide energy. It requires a more complex barrel structure and additional repeated external circuitry. Barrel sections are ceramic, as opposed to metal, since the barrel has been replaced by a series of flow through capillaries. Prefill pressures are still in the 10–30 atm range, although somewhat lower pressures may now also have some attractiveness. The powder preferably starts in the second capillary chamber 41, but could also be distributed from the second chamber some distance in the direction of the muzzle. The high pressure generated in the downstream capillary chambers 43, 45 provide a temporary restraint to powder motion early in time, while the density of gas in the downstream barrel 47 is rapidly reduced by high velocity flow out of the muzzle 49. This method provides a way of simulating the action of a detonation gun, in that the entire barrel is suddenly brought up to high temperature and pressure followed by subsequent expulsion of the gas and entrained powders through the muzzle exit. Electrothermal heating provides a method to go far beyond what can be achieved with combustion heating in substantially the same geometry. Some of the specific advantages here over the detonation gun is that the pressure goes 100 times higher (up to 1000 atm or more), the temperature can be a factor of 3–5 higher, (i.e. up to about 12,000K), and the density of the gas itself is a factor of 10–30 times higher.

A separate multiple pulse forming network 51 is connected to each capillary chamber 5, 41, 43, 45.

As shown in FIG. 15, triggering circuit 6 extends between first and second electrodes 7 and 9 in capillary chamber 5. Triggering circuit 42 extends between electrodes 9 and 40 in capillary chamber 41. Triggering circuit 44 extends between electrodes 40 and 48 in capillary chamber 43. Triggering circuit 46 extends between first and second electrodes 48 and 50 in capillary chamber 45. Each network 51 is programmed to provide optimal axial pressure and temperature profiles. Discharge initiation 53 is accomplished most easily by short fast rising high voltage pulses inductively coupled into the capacitor circuit between each of the electrodes 55. A certain amount of experimental investigation will be required to optimize this configuration. The performance requirements on the muzzle shutter valve can be somewhat relaxed also, since the high pressure in the barrel can now also naturally act to help force the valve open on a faster time scale.

The tube 1 of the present pulsed plasma sprayer is readily scalable to larger or smaller deposition rates. For a given gas operating temperature, the amount of powder that is sprayed per pulse is roughly proportional to the gas mass in the capillary chamber. The energy per pulse also scales as the gas mass in the capillary chamber for constant temperature. Increased energy drives the system to higher pressure if the capillary volume remains constant. In one preferred embodiment, the device sprays in the range of 100 to 200 milligrams of powder per pulse. At 200 milligrams per pulse, an output of about 6–7 kilograms per hour is sprayed, an efficiency that is well above all existing techniques at high velocity. The system may be scaled to an even larger size, while maintaining peak pressures of about 1 kbar, thereby yielding higher deposition rates by simply increasing the size of the capillary chamber, either diameter or length or both. Energy per pulse scales roughly as the capillary chamber volume. Embodiments having those larger deposition rates have utility for forming metallurgically bonded WC-Co wear coatings on large heavy equipment components.

Figure 16:
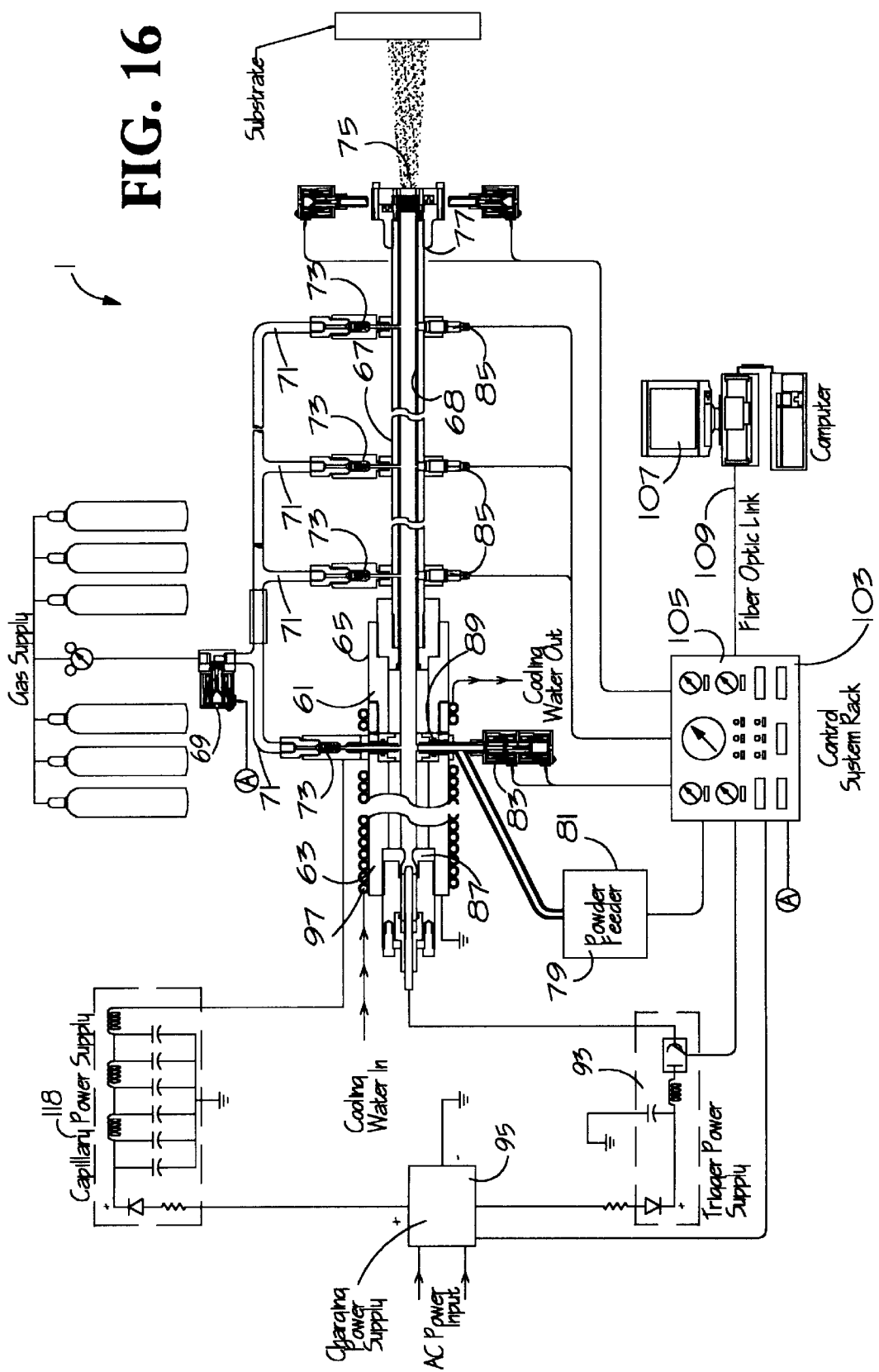
FIG. 16 schematically shows a preferred embodiment of the pulsed plasma sprayer system.
Figure 17B:
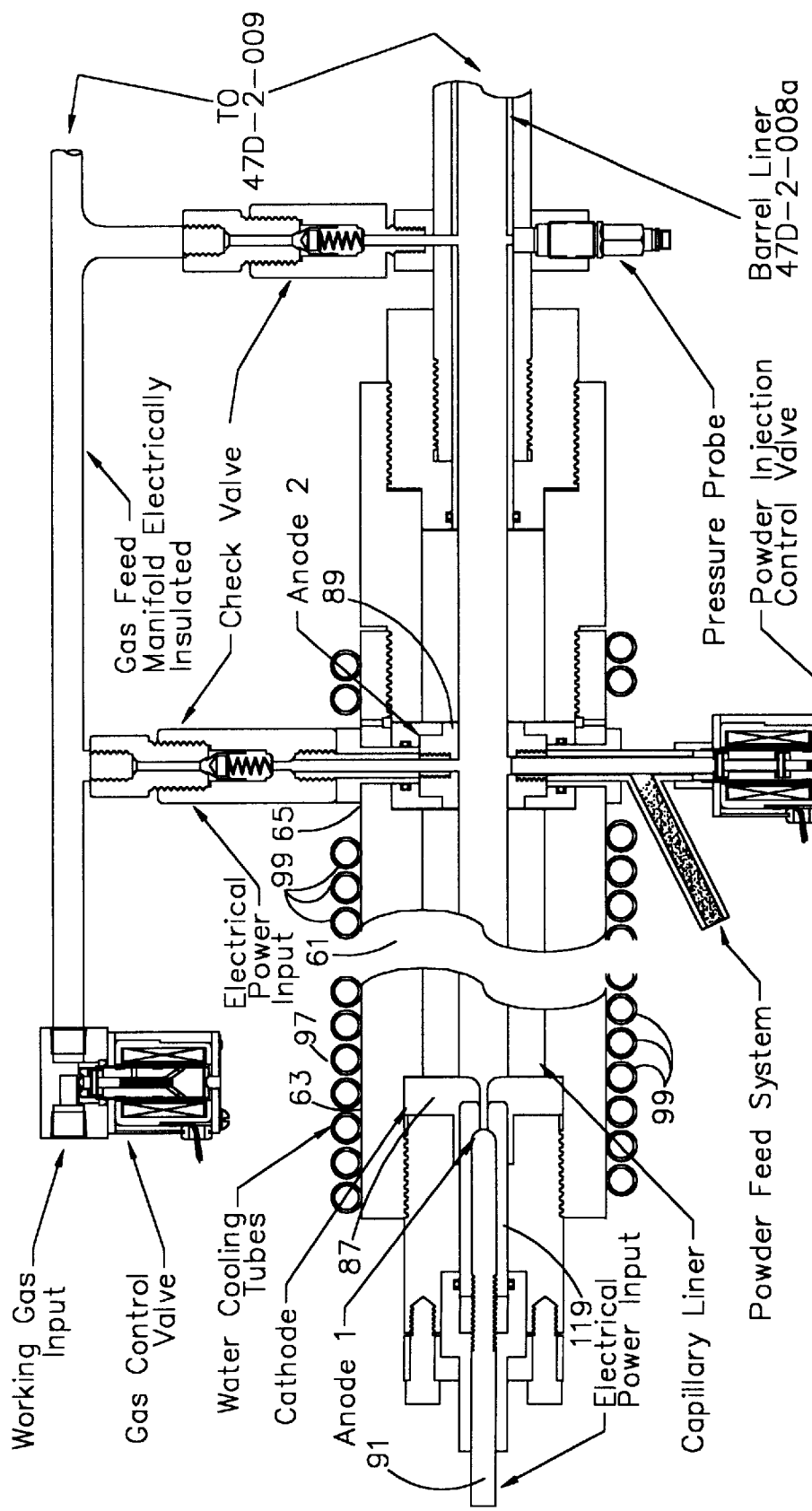
FIG. 17B shows the capillary end of the pulsed plasma sprayer shown in FIG. 16 with an explicit plasma microjet triggering mechanism.
Figure 18:
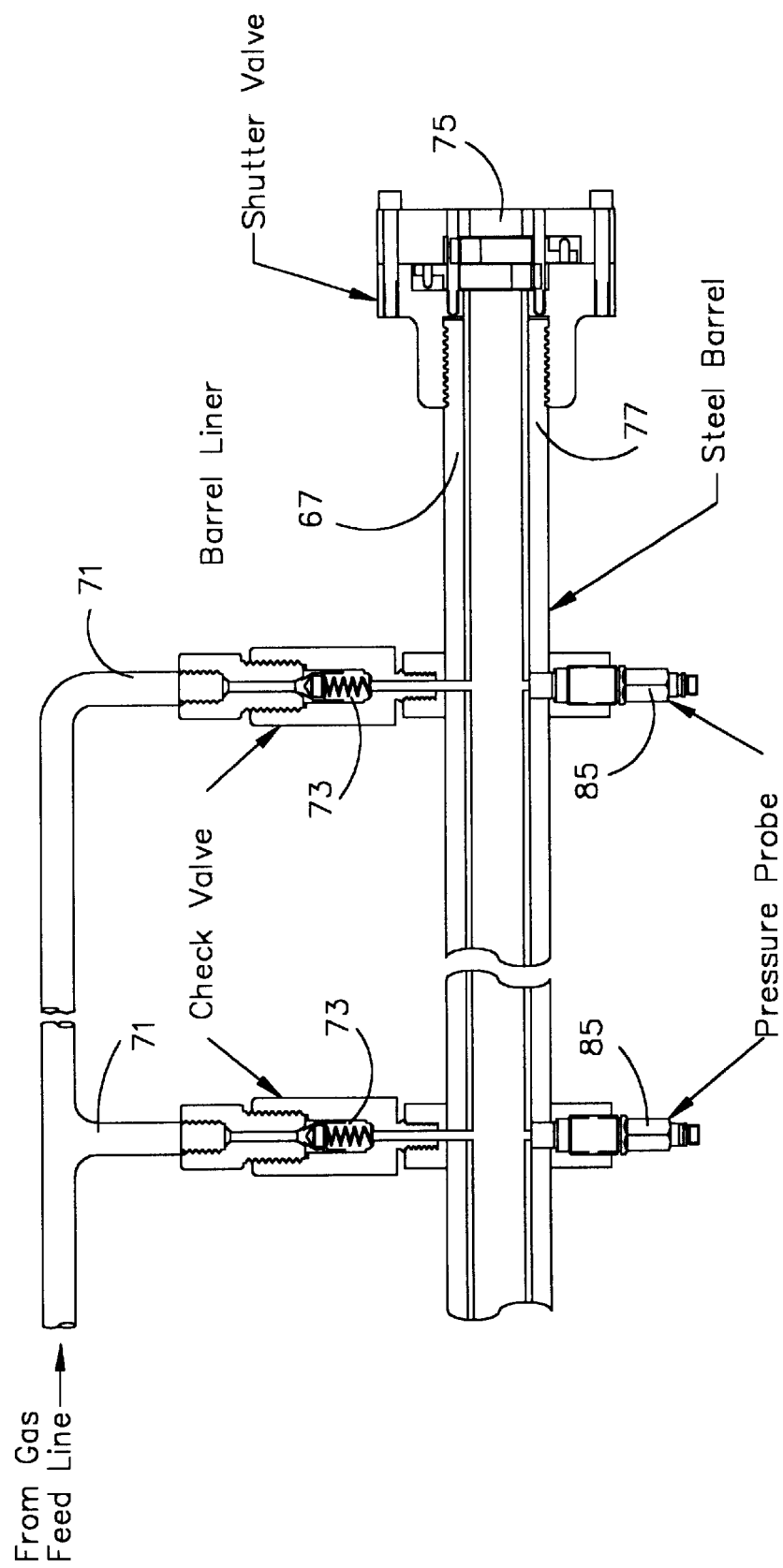
FIG. 18 shows the muzzle end of the pulsed plasma sprayer shown in FIG. 16.
Figure 20:
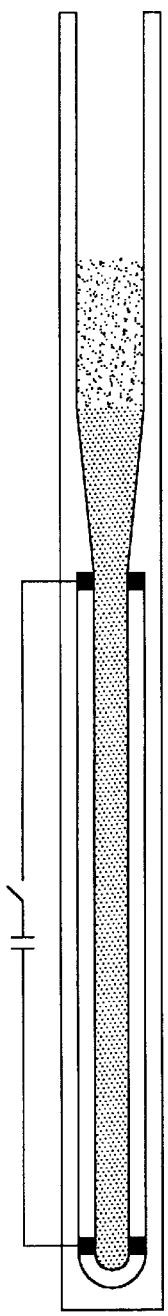
FIGS. 20, 21, 22 and 23 show possible nozzle configurations for the capillary chamber.
Figure 21:
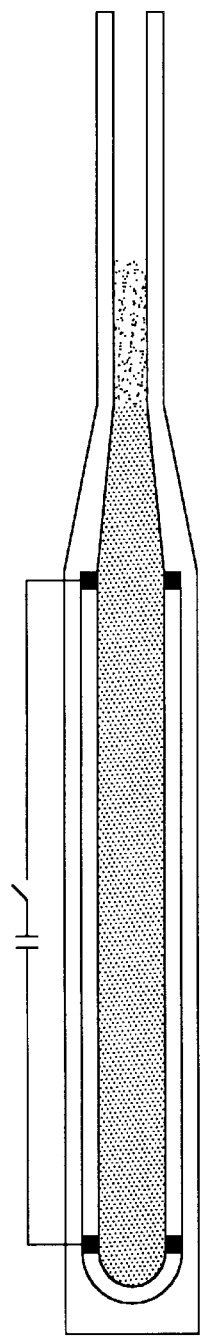

As shown in FIGS. 16–18, the pulsed plasma sprayer 1 includes a capillary chamber 61 having a first end 63 and a second end 65 and a barrel 67 connected to the second end 65 of the chamber 61. A gas injection system 69 is connected to the capillary chamber 61 and to the barrel 67 by multiple gas feed lines 71. An electrically insulating break in this line is provided if the optional gas feed port through electrode 89 is utilized. Check valves 73 are included where the gas lines 71 meet the capillary chamber 61 and the barrel 67. A muzzle shutter valve 75 is positioned at the distal end 77 of the barrel 67 for intermittent sealing of the barrel 67 between pulses. The barrel 67 preferably has a liner 68 or inner coating material made of a refractory metal or ceramic to withstand high temperature operation. A powder feeding system 79, including a coating powder feeder 81 and a powder injection control valve 83, is connected slightly downstream from the capillary chamber 61 for delivering coating powder particles into the barrel 67. Multiple diagnostics 85 are operationally connected to the barrel 67 and capillary chamber 61 for providing situational feedback.

As shown in FIGS. 16 and 17A and 17B, the capillary chamber 61 has a first electrode 87 positioned at its first end 63 and a second electrode 89 positioned at its second end 65. The second electrode 89 is electrically insulated from the metallic outer jacket and barrel which are both grounded for safety. A short section of ceramic liner 88 between the second electrode 89 and the beginning of the barrel 67 provides high voltage standoff. Appropriately seal materials are located throughout the assembly as required to seal against high pressure. The first electrode 87 is grounded through metallic contact to the outer jacket. An arc discharge ignitor 91 is positioned adjacent the first end 63 for providing discharge initiation through action of a microjet or as an arcing guard electrode. A trigger pulse forming generator 93, which is charged by a power supply 95, is electrically connected to the arc ignitor 91. A main capillary pulse forming network 118 is electrically connected to the second electrode 89.

A cooling system 97, including multiple water cooling tubes 99, is situated around the outer surface of the capillary chamber 61 and barrel 67 for carrying away waste heat deposited in the capillary and barrel walls. Cooling channels could also easily be designed into the steel jacket and barrel assemblies.

As shown in FIG. 16, a control system 103 is included for controlling the operations of the sprayer 1. The control system 103 is preferably connected to the powder feeder 81, the powder feeder injection valve 83, the main pulse forming network trigger 93, the power supply 95, the diagnostics 85 and the muzzle shutter 75. The control system rack 105 of the control system 103 is connected to a computer 107 by a fiber optic link 109 for remote control and programming.

FIG. 19 is a table listing major subsystems and components of the present system 1 along with each their corresponding function.

Figure 22:
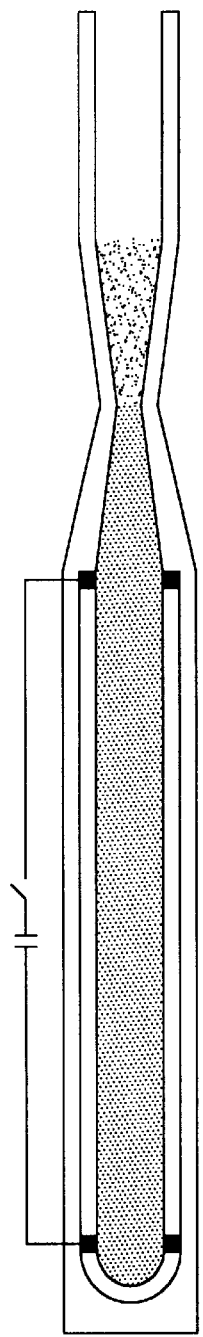
Figure 23:
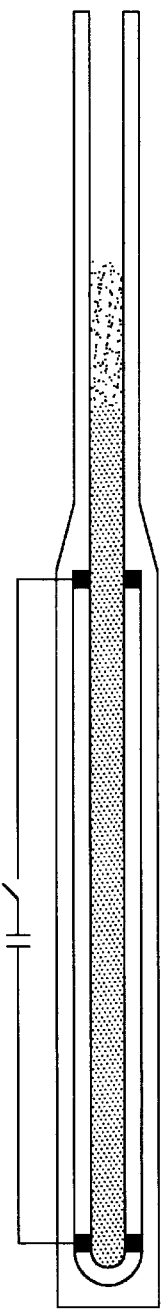

FIGS. 20–23 show various geometrical configurations for the capillary nozzle of the present invention. FIG. 23, the constant diameter configuration, is the preferred embodiment. By establishing a constant diameter, the density of the gas is used most effectively. There is, in principle, no supersonic shock formation, other than the transient shock which travels through the barrel on turnon. Furthermore, the configuration shown in FIG. 23 is the easiest and most inexpensive configuration to manufacture. That embodiment is preferred due to the fact that the acceleration of the powder particles is a function not only of the gas flow velocity but also of the density. Using isentropic flow theory as a guide, increase in flow velocity for the embodiments shown in FIG. 20, as gas expands through the nozzle, results in higher flow velocity but lower density. If the barrel contains gas at atmospheric pressure, a shock forms which actually limits the attainable velocity. In a vacuum, very high velocities (i.e., above 20 km/s) are possible. The embodiment shown in FIG. 21 eliminates the shock and requires a larger quantity of gas in the chamber for a given barrel size. The embodiment shown in FIG. 22 provides extra performance by the presence of a converging-diverging throat.

The capillary chamber, to be economically viable, must operate in a non-ablative mode. It is important that the capillary chamber include an insulator which allows the device to operate at as high temperatures as possible, thereby maximizing heat transfer to the particles and maximizing the gas speed which ultimately determines the particle speed. Preferred embodiments of the present invention include a capillary chamber having a ceramic insulating liner. Ceramics offer a superior combination of temperature and chemical erosion resistance. The ceramic liner is tubular and is reinforced against tensile fracture from internal pressure by a steel jacket heat-shrunk around the liner as a containment reinforcement. In preferred embodiments, the ceramic insulator has a length of about 10–20 cm and an inner diameter of about 1–2 cm. The resultant diametric fit interference is calculated such that the compressive prestress on the ceramic is at least equal to the tensile stress imposed by the subsequent in-service discharge pressure. In a preferred embodiment, the ceramic material is boron nitride, having sufficient mechanical strength to sustain a prestress of 2.5 kbar. Other advanced ceramics can also be used, such as silicon nitride and silicon carbide, which can provide operation at higher temperatures and pressures than boron nitride although at higher cost. Advancement in the art of advanced ceramic materials will no doubt result in better ceramics available in the future, and these could be used equally as well.

Since a ceramic insulator must be used for the capillary liner, consideration must be given to the thermal loads to the wall to determine at what temperatures the capillary discharge can operate and for how long. As is well known, the temperature rise of a surface subjected to a sudden heat flux q is given by $\Delta T = \alpha q t^{1/2}$, where $\alpha = 2/(\pi \rho c k)^{1/2}$ and $\rho$ is density, c is specific heat and k is thermal conductivity. This equation indicates that ablation can be avoided, for a given heat flux q, by keeping the pulse time sufficiently short. The so-called "grace period" is the time a surface can be exposed to a given thermal flux before ablation begins, and is different for each material as determined by its $\alpha$ and vaporization temperature. Such calculations show that the capillary discharge can be operated at temperatures in the 1.0 to 1.5 eV range for 100–1000 microseconds, depending on the ceramic used, without ablation damage to the ceramic insulator. A conservative choice is to limit the temperature to 1 eV for no more than 200–300 microseconds to give a large operating margin for a commercial device. It is generally desirable to operate at as high a temperature as practical in order to maximize heat transport to the particles and to maximize the sound speed which ultimately determines the powder particle speed, but not so high as to cause vaporization of the surface of the powder. The exact allowable parameters could in some cases fall outside the approximate values stated above and will clearly depend on the specific powder being sprayed and desired coating features.

The coating powder feeder system may include any powder injection technique providing pulsed operation, as opposed to continuous feed, and which can inject into a prepressurized chamber at 10–30 atm. To make the most efficient use of the gas in the capillary chamber, the powder is preferably placed at the exit of the capillary chamber immediately downstream from the second electrode 89. Powder may be preheated to a warm temperature prior to injection into the barrel. Such preheating can be accomplished by any of a variety of industry standard ways, such as electric resistance heating of a chamber through which the carrier gas flows. The powder carrier gas should ideally be the same mixture as the capillary working gas. Preheated powders allow more efficient and uniform heating into the interior of the powders.

The powder feeder needs a valve located at the injection port which opens to allow powder injection, and then recloses to seal against the transient high pressure pulse from the plasma jet firing. This could include a reciprocating piston as shown schematically in FIG. 16 or any other convenient means of achieving the same end. The powder feeder should be capable of "puffing" in a metered quantity of powder, preferably in the range 30–150 mg. Larger or smaller quantities may be useful in some circumstances. One or more powder feeder ports could be used, allowing pulsed injection of different kinds of powders either on the same spray pulse event or sequenced such that one powder is sprayed on one shot while a different powder is sprayed on the next shot. The number of powder feeders that can be utilized is limited only by the available space on the barrel. Additionally, one or a small number of powder injection ports could be used each of which could have multiple powder types fed into that feed line from an external source, so that any given powder feed port is multiplexed between different powder hoppers. In this manner, complex functionally gradient coatings could be built up one pulse at a time.

The arc discharge is preferably initiated at pressures up to 30 atmospheres and perhaps more. For practical reasons it is generally desirable to operate the main capacitor bank at voltages no higher than about 10 kV. Since high voltage breakdown of the 10–30 atm gas in the capillary would require much higher voltages than this to break down, a mechanism must be provided to provide a low level of ionization or conductivity in the gas to get the arc started and firmly established. Once any minimal path of conductivity is established between the two main capillary electrodes, the modest voltage (less than 10 kV) and the low impedance of the main capillary capacitor bank 118 will be able to easily establish and maintain the full arc discharge of a few tens of kiloamps. In single shot capillary discharge devices operated at one atmosphere or more this function is typically provided by a metallic foil fuse through which the main capacitor bank discharges causing fuse vaporization after a few microseconds and subsequent establishment of an arc at low voltage. In a repetitive device such as this invention, such a solution cannot be used. That initiation may be accomplished using a variety of techniques, including a high voltage spike, inductively coupled high voltage pulses, rf excitation, plasma microjets, or guard electrodes among others.

It is also generally desirable to operate the main capacitor bank circuit without an explicit mechanical or electromechanical switch due to lifetime issues and costs associated with such switches. This is easily accomplished by using the gas in the capillary volume as a virtual switch. It is in an "open" state prior to triggering the ignitor mechanism, and it is "closed" after the conductivity path has been established by a separate "triggering mechanism".

The electrical circuit of FIG. 16 (or the expanded view in FIGS. 17A and 17B) shows one way of accomplishing the triggering using plasma microjets. The main capillary bank is charged to an appropriate value, typically in the 3–10 kV range. This voltage appears across the two main electrodes 87 and 89. The first electrode 87 has an annular shape with a throat diameter smaller than the ceramic capillary diameter. When the triggering power supply 93 energizes the trigger electrode 91 with high voltage, an arc forms between the electrode 91 and electrode 87. This triggering mechanism is appropriate for capillary discharge chambers less than about 10 cm in length.

For longer capillary discharge chambers (i.e. above about 10 cm in length) the triggering electrode geometry should be modified slightly to enhance the effect. If the throat of electrode 87 is reduced to about 5–10% the diameter of the ceramic capillary inner diameter, and the ceramic insulator 119 between the trigger electrode 91 and the electrode 87 is extended forward as shown in FIG. 17B, a tiny capillary arc discharge region is formed. When the trigger arc forms in this tiny capillary, a tiny energetic high pressure plasma jet or "microjet" is created which jets forward into the main capillary region. This hot conducting jet penetrates the gas, propagating along the axis of the main capillary. It will also gradually expand radially. When the hot conducting core of this jet reaches near the end of the main capillary near the second electrode 89 it thus forms a conducting path through which the lower voltage of the main capillary bank can now breakdown, conduct and establish the main capillary arc discharge.

Electrodes are positioned at both ends of the capillary chamber. A small amount of erosion of the electrodes may occur over time and periodic replacement may be required. The choice of electrode material is dependent on expected chemistries in the flow. Preferred electrode materials include tungsten, tungsten alloys, copper alloys, carbon, and alumina dispersion strengthened copper. Preferably, the electrodes have lifetimes above $10^6$ pulses. At a pulse rate of 10 pps, that corresponds to 28 hours of continuous operation.

Figure 24:
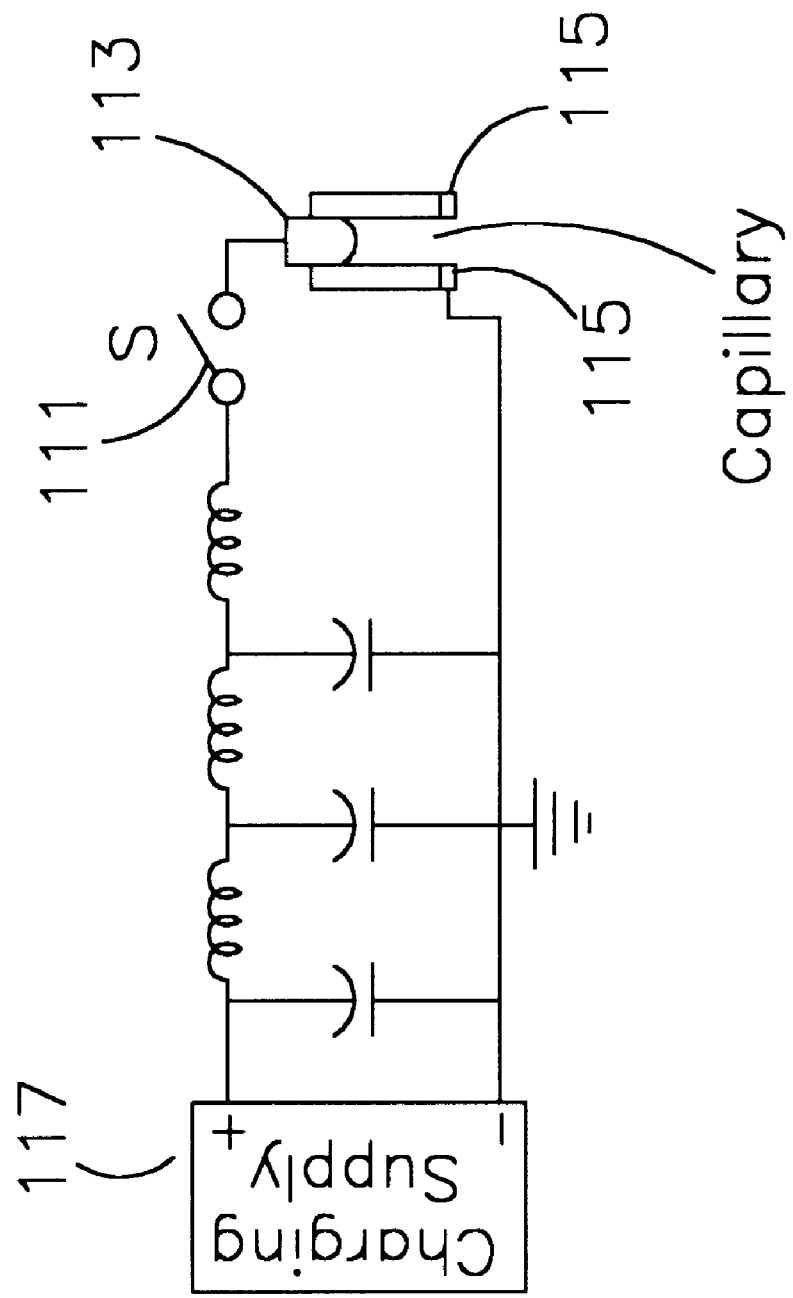
FIG. 24 shows a preferred embodiment of the main capillary discharge pulse forming network for use in the present system.

Current to the capillary arc discharge chamber is supplied by a pulse forming network. A preferred embodiment of the network is shown in one version in FIG. 24, in which the current paths are easier to see than in FIG. 16. When the switch 111 is closed, high voltage is switched across the electrodes 113, 115, followed by high voltage breakdown of the gas in the capillary chamber. The network capacitance and inductance values determine the pulse width of the current. The pulse width $\tau$ is given by $\tau=2CZ$, where C is the total network capacitance, $Z=(L/C)^{1/2}$ is the network impedance and L is the total network inductance. The charging voltage and the circuit impedances determine the peak current. Capillary resistances are typically about 100 mΩ. The transfer efficiency from the network to the capillary load is given by $f=4(R/Z)/(1+R/Z)^2$. For matched loads, the transfer is ideally 100%. While parasitic losses prevent 100% efficiency, those losses are minimal. Preferred design voltages are no more than 10 kV and preferred discharge currents are in the few 10's kA range. The specific values depend on the size of the specific system, with physically larger capillaries requiring correspondingly higher currents and ohmic heating energy input.

The pulse forming network 118 can be continuously charged by a variety of means, including a dc high voltage power supply 117 using a filter and a ballast, or a line reactor incorporated into the power supply directly, or by commercially available switching power supplies. Note that in the preferred embodiment of the main capillary power supply circuit 118 shown in FIG. 16, there is no need for a switch, as described earlier, since the high pressure gas in the main capillary acts as an open switch until the triggering electrode provides a path of conductivity between the two main electrodes 87 and 89, thus closing the "switch".

Diagnostics and sensors are included in the present device for measuring plasma pressure, temperature and flow velocity; powder velocity and temperature; capillary current, voltage and pressure; average thermal flux to capillary and barrel walls; coating powder feed rate; temperatures of capillary chamber outer jacket, barrel, and substrate. The time of triggering the capillary discharge current can be determined by direct measurement and sensing of the rarefaction wave position and velocity using pressure sensors, or by sensing the muzzle valve opening position and using preset time delays, whichever is most convenient.

The muzzle shutter valve can be any mechanical shutter that can meet the functional requirements. It must seal against a static pressure of up to and perhaps more than about 500 psi pressure. It must be capable of opening completely within about 500 microseconds for the best performance. The opening speed is dependent on the sound speed of the gas filling the barrel, and on the length of the barrel, with higher sound speed and shorter barrels requiring faster operation. Gas mixes with slower sound speeds can successfully operate with slower opening valves, but won't provide peak performance. Sealing does not need to be perfect, although that is preferred. The valve must be capable of performing these functions at repetition rates of about 10–20 Hz.

While the invention has been described with reference to specific embodiments, modifications and variations of the invention may be constructed without departing from the scope of the invention, which is defined in the following claims. It is anticipated that persons skilled in the relevant arts, armed with the knowledge provided by this disclosure, will contemplate a variety of modifications in the structure and uses of this invention. All such modifications and variations are expressly contemplated as being encompassed within the claims appended below.

We claim:

1. A pulsed electrothermal powder spray apparatus comprising a confined capillary arc discharge chamber, the capillary chamber having a first end and a second end, a first electrode positioned at the first end of the capillary chamber, and a second electrode positioned at the second end of the capillary chamber, a barrel having an attached end and a muzzle, with the attached end of the barrel connected to the second end of the capillary chamber such that a continuous cavity is formed from the first of the capillary chamber to the muzzle end of the barrel, a powder injector for injecting and a triggering circuit and pulse forming network connected to the electrodes for creating an arc discharge in the capillary chamber.

2. The apparatus of claim 1, further comprising a movable shutter positioned at the muzzle of the barrel.

3. The apparatus of claim 2, wherein the capillary chamber further comprises an inner insulating liner and an outer reinforcing jacket and the insulating liner is made of a ceramic material.

4. The apparatus of claim 3, wherein the ceramic material is selected from the group consisting of boron nitride, silicon carbide, silicon nitride, or any advanced high temperature electrical insulator material providing similar or better strength and high temperature operation.

5. The apparatus of claim 3, wherein the outer reinforcing jacket is made of steel or steel alloy heat shrunk around the ceramic insulator liner.

6. The apparatus of claim 1, wherein the cavity defined by walls of the barrel and capillary chamber has a constant inner diameter, and wherein the inner diameter is about 2 centimeters, and wherein the barrel has a length ranging from about 20 centimeters to about 70 centimeters, wherein the capillary chamber has a length ranging from about 10 centimeters to about 20 centimeters.

7. The apparatus of claim 1, wherein the first electrode is a cathode and the second electrode is an anode, wherein the anode has an annular shape and an inner diameter equal to the inner diameter of the capillary chamber, and wherein the first end is closed to contain pressure generated by a discharge.

8. The apparatus of claim 1, wherein the capillary chamber comprises a first capillary chamber and further comprising a second capillary chamber having first and second electrodes, wherein the triggering circuit further comprises a first triggering circuit and a second triggering circuit, wherein the first triggering circuit is connected to the first and second electrodes of the first capillary chamber, and wherein the second triggering circuit is connected to the first and second electrodes of the second capillary chamber.

9. The apparatus of claim 8, wherein the second capillary chamber is positioned at the second end of the first capillary chamber.

10. The apparatus of claim 8, wherein the second capillary chamber is inserted in the barrel downstream from the first capillary chamber.

11. The apparatus of claim 1, wherein the capillary chamber comprises a main capillary chamber and further comprising multiple secondary capillary chambers positioned in the barrel downstream from the main capillary chamber, wherein the triggering circuit further comprises a main triggering circuit connected to the electrodes of the main capillary chamber and further comprising multiple triggering circuits connected to the multiple secondary capillary chambers, wherein a number of secondary capillary chambers equals a number of multiple triggering circuits, and wherein a single triggering circuit is connected to each secondary capillary chamber.

12. The apparatus of claim 1, wherein the barrel is made of ceramic material.

13. The apparatus of claim 1, further comprising a pulsed coating powder feeder connected to the barrel for feeding coating powder to the barrel.

14. The apparatus of claim 13, further comprising plural coating powder sources connected to the pulsed coating powder feeder for supplying powder from the sources separately to the feeder.

15. The apparatus of claim 1, further comprising plural powder feeder ports connected to the barrel for feeding coating powder to the barrel.

16. A pulsed thermal spray method for applying high quality coatings comprising the steps of providing a containment tube having a capillary chamber, a barrel connected to the chamber and a movable shutter connected to an open end of the barrel, wherein walls of the barrel and capillary chamber define a continuous cavity, in the barrel, closing the movable shutter, filling the barrel and the capillary chamber with a gas, adding powder, opening the shutter, venting the gas from the barrel through the open shutter, propagating a rarefaction wave back up the barrel towards the capillary chamber, providing an electrical discharge to the capillary chamber as the rarefaction wave nears the capillary chamber, creating an expanding plasma by heating and pressurizing the gas in the capillary chamber, using the expanding plasma, heating the powder and accelerating the powder down the barrel towards the open end of the barrel, and depositing the accelerated powder on a substrate.

17. The method of claim 16, further comprising the step of flushing the barrel with low pressure gas following the depositing of the accelerated powder on the substrate.

18. The method of claim 16, further comprising delivering a temperature regulating material into the capillary chamber prior to the providing the electrical discharge step.

19. The method of claim 16, wherein the providing the electrical discharge step further comprises storing electrical energy in a capacitor, connecting the capacitor to the capillary chamber and transferring the stored electrical energy from the capacitor to the capillary chamber in an arc discharge.

20. The method of claim 16, further comprising the step of recirculating vented gas from the barrel to a gas storage assembly.

21. The method of claim 16, further comprising eliminating oxygen in the barrel prior to the positioning of the powder in the barrel.

22. The method of claim 16, wherein the providing an electrical discharge step has a short duration, the short duration ranging between approximately 10's to 100's of microseconds.

23. The method of claim 16, wherein the providing an electrical discharge step further comprises delivering a pulse to the capillary chamber from a pulse forming network.

24. The method of claim 16, wherein the filling the barrel and capillary chamber with a gas is selected from the group consisting of supplying the gas at atmospheric pressure, supplying the gas by liquid injection, injecting a suspension of fine powder, and sweating a thin liquid film onto a surface of an insulating wall of the capillary chamber.

25. The method of claim 16, wherein the positioning of powder in the barrel comprises pulsing powder into the barrel from a pulsed powder feeder.

26. The method of claim 25, wherein the pulsing of powder into the barrel comprises separately pulsing powder from plural sources into the barrel.

27. The method of claim 16, wherein the positioning of powder in the barrel comprises supplying powder from plural sources to the barrel.

28. A pulsed electrothermal plasma sprayer system comprising a containment tube, a gas injection assembly connected to the containment tube, a feeder assembly connected to the containment tube and an ignition assembly connected to the containment tube, wherein the containment tube further comprises a capillary chamber section, a barrel section connected to the capillary chamber section, a continuous cavity defined by the walls of the capillary chamber section and barrel section and wherein the gas injection assembly further comprises a gas supply and at least one gas feed line connecting the gas supply to the containment tube, wherein the feeder assembly further comprises a powder supply and a powder feed line connecting the powder supply to the barrel section of the containment tube, and wherein the ignition system further comprises an arc ignitor connected to the capillary chamber section of the containment tube for providing arc discharge initiation to the capillary chamber section, a pulse forming network connected to the arc ignitor for supplying energy to the ignitor and a power supply connected to the network for providing charging current to the network.

29. The system of claim 28, further comprising a movable shutter connected to an open, muzzle end of the barrel section.

30. The system of claim 29, further comprising a control system connected to the ignition assembly, the feeder assembly and the shutter for monitoring and controlling operations of the assemblies and shutter.

31. The system of claim 30, wherein the control system is programmable and further comprises a control system rack electrically connected to the shutter, the ignition assembly and the feed assembly and a computer connected to the control rack by a fiber optic link for programming operations of the control system rack.

32. The system of claim 28, wherein the gas injection assembly further comprises check valves positioned in the gas feed line where the gas feed line meets the containment tube, and wherein the feeder assembly is a power feeder assembly which further comprises a powder injection control valve operably connected with the powder feed line for controlling powder injection.

33. The system of claim 28, further comprising a cooling system positioned around the barrel and capillary chamber sections of the containment tube.

34. The system of claim 33, wherein the cooling system further comprises water cooling extending around the barrel section and capillary chamber section of the containment tube.

35. The system of claim 28, further comprising diagnostics connected to the containment tube for detecting conditions in the cavity of the containment tube.

36. The system of claim 28, wherein the barrel section further comprises a thin barrel liner and a metal barrel cover surrounding the barrel liner, and wherein the capillary chamber section further comprises an inner insulating layer, a protective jacket surrounding the insulating layer, a first electrode positioned at a first end of the capillary chamber section and a second electrode positioned at a second end of the capillary chamber section.

37. The system of claim 28, wherein the ignition assembly further comprises a pulse forming network connected to the ignitor and a power source connected to the network, and wherein the network further comprises a switch and a capacitor bank.

38. The system of claim 28, further comprising a pulsed coating powder feeder connected to the barrel section for feeding coating powder to the barrel.

39. The system of claim 38, further comprising plural coating powder sources connected to the pulsed coating powder feeder for supplying powder from the sources separately to the feeder.

40. The apparatus of claim 28, further comprising plural powder feeder ports connected to the barrel section for feeding coating powder to the barrel.

41. A pulsed electrothermal plasma sprayer system comprising a containment tube, a gas injection assembly connected to the containment tube, a feeder assembly connected to the containment tube and an ignition assembly connected to the containment tube, wherein the containment tube further comprises a capillary chamber section, a barrel section connected to the capillary chamber section, a continuous cavity defined by the walls of the capillary chamber section and barrel section and wherein the gas injection assembly further comprises a gas supply and at least one gas feed line connecting the gas supply to the containment tube, wherein the feeder assembly further comprises a powder supply and a powder feed line connecting the powder supply to the barrel section of the containment tube, and wherein the ignition system further comprises an arc ignitor connected to the capillary chamber section of the containment tube for providing arc discharge initiation to the capillary chamber section, a pulse forming network connected to the arc ignitor for supplying energy to the ignitor and a power supply connected to the network for providing charging current to the network, wherein the barrel section further comprises a thin barrel liner and a metal barrel cover surrounding the barrel liner, and wherein the capillary chamber section further comprises an inner insulating layer, a protective jacket surrounding the insulating layer, a first electrode positioned at a first end of the capillary chamber section and a second electrode positioned at a second end of the capillary chamber section, and wherein the first electrode has an anode end that has an annular shape and an inner diameter that is smaller than an inner diameter of the capillary assembly.

42. A pulsed electrothermal powder coating sprayer apparatus comprising an axially extending barrel having a closed end and a muzzle opposite the closed end, plural axially aligned capillary chambers having axially spaced electrodes in pairs extending along the barrel from the closed end toward the open end, a pressurized source of working fluid connected to the barrel for delivering working fluid to the capillary chambers, a coating powder source connected to the barrel between the closed end and the muzzle for delivering coating powder to the barrel, a d.c. power source, capacitors connected to the d.c. power source and to the electrode pairs, arc discharge initiators connected to the electrode pairs for creating axially extending arc discharges between the electrode pairs within the working fluid in the capillary chambers, for heating and expanding the working fluid and thereby heating, softening and accelerating the coating powder through the barrel and out of the muzzle toward a surface to be coated.

43. The apparatus of claim 42, wherein the pressurized source of working fluid is connected to the barrel at plural locations along the barrel.

44. The apparatus of claim 42, further comprising a shutter at the muzzle for opening and closing the muzzle.

45. The apparatus of claim 44, further comprising a shutter control connected to the shutter for opening and closing the shutter.

46. The apparatus of claim 42, wherein each electrode pair shares a common electrode with an adjacent electrode pair.

47. The apparatus of claim 42, further comprising a pulsed coating powder feeder connected to the barrel for feeding coating powder to the barrel.

48. The apparatus of claim 47, further comprising plural coating powder sources connected to the pulsed coating powder feeder for supplying powder from the sources separately to the feeder.

49. The apparatus of claim 42, further comprising plural powder feeder ports connected to the barrel for feeding coating powder to the barrel.

50. A pulsed electrothermal powder spray apparatus comprising a confined capillary arc discharge chamber, the capillary chamber having a first end and a second end, a first electrode positioned at the first end of the capillary chamber, and a second electrode positioned at the second end of the capillary chamber, a barrel having an attached end and a muzzle, with the attached end of the barrel connected to the second end of the capillary chamber such that a continuous cavity is formed from the first end of the capillary chamber to the muzzle end of the barrel a powder injector connected thereto, and a triggering circuit and pulse forming network connected to the electrodes for creating an arc discharge in the capillary chamber, wherein the cavity defined by walls of the barrel and capillary chamber has a constant inner diameter.

51. The apparatus of claim 50, wherein the barrel has a length ranging from about 10 to about 35 times the diameter, and wherein the capillary chamber has a length ranging from about 5 to about 10 times the diameter.

52. Apparatus comprising a pulsed electrothermal powder spray coating system having a capillary and a barrel in continuation, a capillary having a closed end and an open end, a barrel in continuation of the capillary, the barrel having first and second ends, the first end of the barrel being connected to the second end of the capillary and the second end of the barrel being remote from the capillary, a spaced electrode pair on the capillary, a working fluid supply connected to the system for supplying working fluid to the system, a coating powder injector connected to the barrel near the first end of the barrel for injecting coating powder into the barrel, a shutter connected to the second end of the barrel for rapidly closing and opening the second end of the barrel and for creating a rarefaction wave propagating from the second end of the barrel toward the capillary, and a high voltage arc initiator connected to the electrode pair for initiating a capillary arc discharge as the rarefaction wave nears the capillary.

53. The apparatus of claim 52, wherein the working fluid supply is connected to the capillary and barrel at multiple points for rapidly filling the barrel and capillary with working fluid.

54. The apparatus of claim 52, wherein a cavity defined by walls of the barrel and capillary chamber has a constant inner diameter.

55. The apparatus of claim 54, wherein the barrel has a length ranging from about 10 to about 35 times the diameter.

56. The apparatus of claim 54, wherein the capillary chamber has a length ranging from about 5 to about 10 times the diameter.

57. A method of spray coating, comprising supplying a pulsed electrothermal powder spray coating system having a capillary with a closed end and an open end, a barrel in continuation of the capillary, the barrel having first and second ends, the first end of the barrel being connected to the second end of the capillary and the second end of the barrel being remote from the capillary, a spaced electrode pair on the capillary, and further comprising supplying working fluid from a working fluid supply connected to the system, injecting coating powder from a coating powder injector connected to the barrel near the first end of the barrel, rapidly opening a shutter connected to the second end of the barrel, creating a rarefaction wave in the barrel, propagating the rarefaction wave from the second end of the barrel toward the capillary, and initiating a capillary arc discharge with a high voltage arc initiator connected to the electrode pair as the rarefaction wave nears the capillary, heating the working fluid, expanding the resulting high pressure working fluid, and entraining and accelerating the powder down the barrel to impact onto the substrate.

58. A method of spray coating, comprising closing a shutter at a muzzle end of a barrel, filling a barrel and a capillary with a working fluid, injecting a coating powder in the barrel, opening the shutter, propagating a rarefaction wave from the muzzle end through the barrel toward the capillary and initiating a high voltage arc in the working fluid between electrodes in the capillary, rapidly expanding the working fluid and rapidly accelerating powder in the barrel out of the muzzle end before repeating closing of the shutter and subsequent steps of the method.

\* \* \* \* \*